(12) United States Patent
Tsujimoto et al.

(10) Patent No.: US 8,617,728 B2
(45) Date of Patent: *Dec. 31, 2013

(54) MAGNETIC TAPE AND METHOD OF MANUFACTURING THE SAME

(75) Inventors: Shinji Tsujimoto, Minami-ashigara (JP); Katsumi Araki, Minami-ashigara (JP); Tomohiro Ichikawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 13/048,624

(22) Filed: Mar. 15, 2011

(65) Prior Publication Data

US 2011/0229740 A1 Sep. 22, 2011

(30) Foreign Application Priority Data

Mar. 16, 2010 (JP) ................................. 2010-059340

(51) Int. Cl.
*G11B 5/716* (2006.01)

(52) U.S. Cl.
USPC .................................. 428/840.5; 428/844.71

(58) Field of Classification Search
None
See application file for complete search history.

(56) References Cited

U.S. PATENT DOCUMENTS

| 3,084,187 | A | * | 4/1963 | Gaertner ........................ 562/107 |
| 6,127,039 | A |   | 10/2000 | Saitoh et al. |
| 7,737,304 | B2 |   | 6/2010 | Omura et al. |
| 7,737,305 | B2 |   | 6/2010 | Omura et al. |
| 2005/0170217 | A1 | * | 8/2005 | Takahashi et al. ...... 428/694 ST |
| 2009/0214768 | A1 |   | 8/2009 | Ichikawa et al. |
| 2009/0258254 | A1 | * | 10/2009 | Omura et al. .................. 428/840 |

FOREIGN PATENT DOCUMENTS

| JP | 3698540 B2 | 6/1999 |
| JP | 2002-42327 A | 2/2002 |
| JP | 2009-96798 A | 5/2009 |
| JP | 2009-205726 A | 9/2009 |
| JP | 2010-049731 A | 3/2010 |

OTHER PUBLICATIONS

Office Action dated Jan. 29, 2013 on Japanese Application No. JP 2010-059340.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic tape comprising a nonmagnetic layer containing a nonmagnetic powder and a binder and a magnetic layer containing a ferromagnetic powder and a binder in this order on a nonmagnetic support. The nonmagnetic layer is a radiation-cured layer formed by curing with radiation a given radiation-curable composition. The nonmagnetic layer has a thickness ranging from 0.5 to 1.3 μm. The relation between the nonmagnetic powder and the binder component contained in the radiation-curable composition satisfies equation (I):

$$480 \leq (\text{BET specific surface area of the nonmagnetic powder } (m^2/g) \times \text{weight of the nonmagnetic powder } (g))/\text{weight of the binder component } (g) \leq 650 \quad (I).$$

9 Claims, No Drawings

US 8,617,728 B2

MAGNETIC TAPE AND METHOD OF MANUFACTURING THE SAME

CROSS-REFERENCE TO RELATED APPLICATIONS

This application claims the benefit of priority under 35 USC 119 to Japanese Patent Application No. 2010-059340, filed on Mar. 16, 2010, which is expressly incorporated herein by reference in its entirety.

BACKGROUND OF THE INVENTION

1. Field of the Invention

The present invention relates to a magnetic tape and to a method of manufacturing the same. More particularly, the present invention relates to a high-density recording magnetic tape with good electromagnetic characteristics, and to a manufacturing method that permits the manufacturing of such a magnetic tape with high productivity.

2. Discussion of the Background

In recent years, as microcomputers, personal computers, and office computers such as work stations have become increasingly widespread, considerable research has been conducted into external storage media in the form of magnetic tapes for recording computer data (known as "backup tapes").

Products in the form of data backup tapes with high recording capacity have been developed in response to an increase in the diversity and quantity of information being recorded. To achieve tapes of high recording capacity, the spacing between the magnetic layer and the magnetic head should be reduced. For example, when large protrusions and indentations are present on the surface of the magnetic layer, output drops due to spacing loss, resulting in compromised electromagnetic characteristics such as heightened dropout, an increased error rate, and a drop in the S/N. Accordingly, the magnetic recording layer surface of a data backup tape of high recording capacity is required to be extremely smooth to achieve good electromagnetic characteristics.

For example, as described in Japanese Patent No. 3,698,540, which is expressly incorporated herein by reference in its entirety, the use of a nonmagnetic layer in the form of a radiation-cured layer positioned beneath the magnetic layer is a known means of increasing the surface smoothness of the magnetic layer. Japanese Unexamined Patent Publication (KOKAI) No. 2002-42327, which is expressly incorporated herein by reference in its entirety, proposes utilizing a prescribed relation between the nonmagnetic powder, carbon black, and binder in the nonmagnetic layer while separately specifying the ultrafine hardness of the nonmagnetic layer before and after curing in the course of manufacturing a magnetic recording medium by the step of forming a magnetic layer on a nonmagnetic layer that has been formed by drying, calendering, and curing a nonmagnetic layer coating liquid. Japanese Unexamined Patent Publication (KOKAI) No. 2002-42327 describes that the above step yields a magnetic recording medium with good smoothness.

In magnetic tapes, the thickness of the tape should be reduced to achieve high recording capacity. The trend is to reduce the thickness of the nonmagnetic layer as well as the magnetic layer. Accordingly, the present inventors examined means of achieving the good electromagnetic characteristics required of high recording capacity data backup tapes in magnetic tapes having thin nonmagnetic layers. This resulted in the determination that it was difficult to obtain a magnetic tape with adequate electromagnetic characteristics with the existing art, including the methods described in Japanese Patent No. 3,698,540 and Japanese Unexamined Patent Publication (KOKAI) No. 2002-42327.

SUMMARY OF THE INVENTION

An aspect of the present invention provides for a means of obtaining good electromagnetic characteristics in a magnetic tape having a thin nonmagnetic layer.

The present inventors conducted research into the causes of the reduced electromagnetic characteristics in magnetic tapes with thin nonmagnetic layers. This resulted in the discovery that the cushioning property of the nonmagnetic layer decreased when the thickness of the nonmagnetic layer was simply reduced, thereby precluding adequate processing by calendering. As a result, the conclusion was reached that filler (abrasive, carbon black, and the like) protruding from the surface of the magnetic layer formed protrusions on the surface of the magnetic layer, causing a drop in electromagnetic characteristics.

Accordingly, the present inventors conducted extensive further research based on the above conclusion, resulting in the discovery that by reducing the quantity of binder component relative to the total surface area of the nonmagnetic powder in the nonmagnetic layer, and employing a nonmagnetic layer in the form of a radiation-cured layer of radiation-curable polyurethane resin obtained from starting materials containing a polyol compound having the sulfonic acid (salt) group denoted by general formula (2), described further below, it was possible to achieve good electromagnetic characteristics in a magnetic tape in which the thickness of the nonmagnetic layer had been reduced (0.5 to 1.3 μm). The reasons for this were presumed to be as follows.

Reducing the binder component relative to the total surface area of the nonmagnetic powder in the nonmagnetic layer as set forth above has the effect of increasing the void ratio of the nonmagnetic layer. Calendering a magnetic tape with an increased void ratio from the side with the nonmagnetic layer is thought to have the effect of causing suitable penetration of filler in the magnetic layer, thereby reducing the protrusion of filler from the magnetic layer surface. Japanese Unexamined Patent Publication (KOKAI) No. 2002-42327 specifies the quantity of binder relative to the total surface area of nonmagnetic powder and carbon black in the nonmagnetic layer, but as stated in paragraph 0015 thereof, Japanese Unexamined Patent Publication (KOKAI) No. 2002-42327 gives indexes for increasing the quantity of binder to maintain curability, which is entirely different from the discovery made by the present inventors.

Since the quantity of powder component in the nonmagnetic layer increases when the quantity of binder component is decreased, the powder component tends to aggregate and the surface smoothness of the nonmagnetic layer decreases. As a result, the surface smoothness of the magnetic layer that is formed over it also ends up decreasing. By contrast, since the above radiation-curable polyurethane resin specified as set forth below has a good dispersion-enhancing effect, it is possible to increase the dispersion of the nonmagnetic powder in the nonmagnetic layer in a state of reduced binder component. Further, employing a radiation-cured layer as the nonmagnetic layer makes it possible to inhibit mixing of the nonmagnetic layer and magnetic layer at the interface thereof, which is thought to contribute to enhancing the smoothness of the surface of the magnetic layer.

Further, improving calendering processability as set forth above can decrease the number of times calendering is conducted, thereby enhancing productivity.

The present invention was devised based on the above knowledge.

An aspect of the present invention relates to a magnetic tape comprising a nonmagnetic layer containing a nonmagnetic powder and a binder and a magnetic layer containing a ferromagnetic powder and a binder in this order on a nonmagnetic support, wherein the nonmagnetic layer is a radiation-cured layer formed by curing with radiation a radiation-curable composition comprising a nonmagnetic powder and a binder component, the binder component comprising a radiation-curable polyurethane resin obtained from starting materials containing a sulfonic acid group containing- or sulfonate group-containing polyol compound denoted by general formula (2):

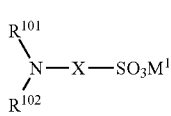
(2)

wherein, in general formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation:

the nonmagnetic layer has a thickness ranging from 0.5 to 1.3 μm, and a relation between the nonmagnetic powder and the binder component contained in the radiation-curable composition satisfies equation (I) below:

480≤(BET specific surface area of the nonmagnetic powder (m²/g)×weight of the nonmagnetic powder (g))/weight of the binder component (g)≤650     (I).

The binder component may comprise a radiation-curable vinyl chloride copolymer containing a structural unit denoted by general formula (1):

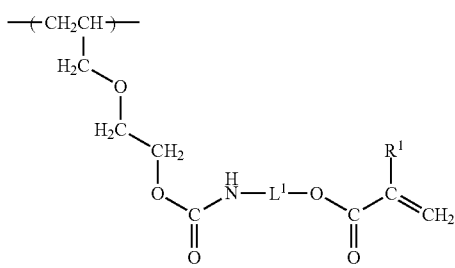
(1)

wherein, in general formula (1), $R^1$ denotes a hydrogen atom or a methyl group, and $L^1$ denotes a divalent linking group denoted by formula (2), formula (3), or general formula (4):

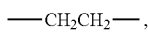
(2)

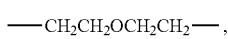
(3)

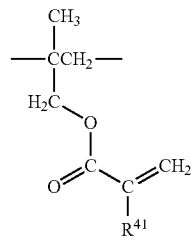
(4)

wherein, in general formula (4), $R^{41}$ denotes a hydrogen atom or a methyl group.

The radiation-curable vinyl chloride copolymer may further comprise a structural unit denoted by general formula (5):

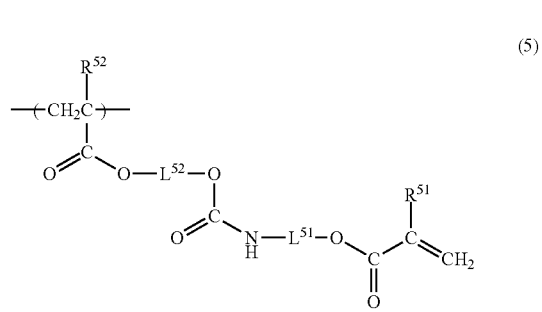
(5)

wherein, in general formula (5), each of $R^{51}$ and $R^{52}$ independently denotes a hydrogen atom or a methyl group, $L^{51}$ denotes the divalent linking group denoted by the above formula (2), formula (3), or general formula (4), and $L^{52}$ denotes a divalent linking group.

The radiation-curable vinyl chloride copolymer may further comprise a cyclic ether structure.

The radiation-curable vinyl chloride copolymer may further comprise a polar group selected from the group consisting of a sulfonic acid group, a sulfonate group, a sulfuric acid group, and a sulfate group.

The nonmagnetic layer may have a void ratio ranging from 25 to 38 volume percent.

The magnetic layer may have a thickness ranging from 0.01 to 0.10 μm.

The magnetic layer may have a center plane average surface roughness, Ra, measured by an atomic force microscope ranging from 1.00 to 3.30 nm.

A further aspect of the present invention relates to a method of manufacturing a magnetic tape, wherein the magnetic tape is the above magnetic tape, and the method comprises:

coating and curing with radiation a radiation-curable composition to form a nonmagnetic layer in the form of a radiation-cured layer, wherein the radiation-curable composition comprises a nonmagnetic powder and a binder component with a relation between the nonmagnetic powder and the binder component satisfying equation (I) below:

480≤(BET specific surface area of the nonmagnetic powder (m²/g)×weight of the nonmagnetic powder (g))/weight of the binder component (g)≤650     (I), the binder component comprising a radiation-curable polyurethane resin obtained from starting materials containing a sulfonic acid group containing- or sulfonate group-containing polyol compound denoted by general formula (2):

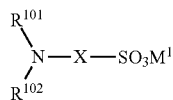

(2)

wherein, in general formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation:

forming a magnetic layer on the radiation-cured layer that has been formed, and then conducting calendering, wherein no calendering is conducted on the nonmagnetic layer prior to forming the magnetic layer.

In the above method, the calendaring may be conducted to achieve a change ΔRa in a center plane average surface roughness Ra ranging from 6.00 to 7.50 nm on the magnetic layer as measured by an atomic force microscope.

The present invention can provide a high recording capacity backup tape with good electromagnetic characteristics with high productivity.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The present invention relates to a magnetic tape comprising a nonmagnetic layer containing a nonmagnetic powder and a binder and a magnetic layer containing a ferromagnetic powder and a binder in this order on a nonmagnetic support. The nonmagnetic layer is a radiation-cured layer formed by curing with radiation a radiation-curable composition comprising a nonmagnetic powder and a binder component. The binder component comprises a radiation-curable polyurethane resin obtained from starting materials containing a sulfonic acid group containing- or sulfonate group-containing polyol compound denoted by general formula (2):

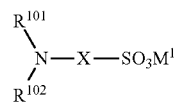

(2)

wherein, in general formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation. The nonmagnetic layer has a thickness ranging from 0.5 to 1.3 μm, and a relation between the nonmagnetic powder and the binder component contained in the radiation-curable composition satisfies equation (I) below:

$$480 \leq (\text{BET specific surface area of the nonmagnetic powder } (m^2/g) \times \text{weight of the nonmagnetic powder } (g))/\text{weight of the binder component } (g) \leq 650 \quad (I).$$

As set forth above, reducing the quantity of the binder component relative to the total surface area of the nonmagnetic powder in the nonmagnetic layer in the manner represented by equation (I) and employing a radiation-curable polyurethane resin capable of exhibiting the good dispersion-enhancing effect as a binder component in the nonmagnetic layer can yield good electromagnetic characteristics in a magnetic tape having a thin nonmagnetic layer of 0.5 to 1.3 μm and enhance the effectiveness of calendering.

The magnetic tape of the present invention will be described in greater detail below.

Radiation-Curable Polyurethane Resin

The radiation-curable polyurethane resin (also referred to as the "polyurethane resin A", hereinafter) that forms the nonmagnetic layer of the magnetic tape of the present invention has been obtained from starting materials containing a sulfonic acid (salt) group containing-polyol compound denoted by general formula (2) below.

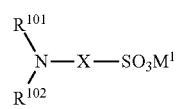

(2)

In general formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation.

Normally, the polyurethane synthesis reaction is conducted in an organic solvent. However, sulfonic acid (salt) group-containing polyol compounds generally have poor solubility in organic solvents, and thus have poor reactivity. Therefore, it was difficult to synthesize polyurethane resin in which the desired quantity of sulfonic acid (salt) group is incorporated. By contrast, with the above sulfonic acid (salt) group containing-polyol compound having good solubility in organic solvents, polyurethane resin in which the desired quantity of sulfonic acid (salt) group is uniformly incorporated can be readily obtained. Accordingly, polyurethane resin A can increase the dispersion in a nonmagnetic layer having a reduced quantity of binder component that satisfies equation (I), effectively increasing the surface smoothness of the magnetic layer. This is thought to contribute to enhancing electromagnetic characteristics.

Polyurethane resin A will be described in greater detail below.

In general formula (2), X denotes a divalent linking group. From the perspective of solubility in organic solvents, the divalent linking group denoted by X desirably contains 2 to 20 carbon atoms, and preferably a divalent hydrocarbon group; an alkylene group, arylene group, or a combination of two or more of these groups is preferred; an alkylene group or an arylene group is of greater preference; an ethylene group or a phenylene group is of still greater preference; and an ethylene group is optimal.

Examples of the phenylene group are o-phenylene, m-phenylene, and p-phenylene groups. An o-phenylene or m-phenylene group is desirable, and an m-phenylene group is preferred.

The above alkylene group desirably comprises equal to or more than 2 but equal to or less than 20, preferably equal to or more than 2 but equal to or less than 4, and more preferably 2, carbon atoms. The alkylene group may be a linear alkylene group or branched alkylene group; a linear alkylene group is desirable.

The above arylene group desirably comprises equal to or more than 6 but equal to or less than 20, preferably equal to or more than 6 but equal to or less than 10, and more preferably 6, carbon atoms.

The above alkylene group and arylene group may comprise the following substituent, but are desirable comprised of just carbon atoms and hydrogen atoms.

Examples of substituents that are optionally present on the alkylene group are: aryl groups, halogen atoms (fluorine, chlorine, bromine, and iodine atoms), alkoxy groups, aryloxy groups, and alkyl groups.

Examples of substituents that are optionally present on the arylene group are: alkyl groups, halogen atoms (fluorine, chlorine, bromine, and iodine atoms), alkoxy groups, aryloxy groups, and aryl groups.

In general formula (2), each of $R^{101}$ and $R^{102}$ independently denotes an alkyl group comprising at least one hydroxyl group and equal to or more than two carbon atoms or an aralkyl group comprising at least one hydroxyl group and equal to or more than eight carbon atoms. The alkyl group and aralkyl group may have substituents other than hydroxyl groups.

In addition to hydroxyl groups, the above alkyl group and aralkyl group may comprise substituents in the form of alkoxy groups, aryloxy groups, halogen atoms (fluorine, chlorine, bromine, and iodine atoms), sulfonyl groups, and silyl groups, for example. Of these, alkoxy groups and aryloxy groups are desirable; alkoxy groups having 1 to 20 carbon atoms and aryloxy groups having 6 to 20 carbon atoms are preferred; and phenoxy groups and alkoxy groups having 1 to 4 carbon atoms are of greater preference.

These alkyl groups and aralkyl groups may be linear or branched.

One or more hydroxyl groups are contained, 1 or 2 are desirable, and 1 is preferred, in each of $R^{101}$ and $R^{102}$. That is, the sulfonic acid (salt) group-containing polyol denoted by general formula (2) is preferably a sulfonic acid (salt) group-containing diol compound.

From the perspective of solubility in organic solvents, availability of starting materials, cost and the like, the alkyl group in $R^{101}$ and $R^{102}$ comprises equal to or more than 2, desirably 2 to 22, preferably 3 to 22, more preferably 4 to 22, and still more preferably 4 to 8 carbon atoms.

From the perspective of solubility in organic solvents, availability of starting materials, cost and the like, the aralkyl group in $R^{101}$ and $R^{102}$ comprises equal to or more than 8, desirably 8 to 22, preferably 8 to 12, and more preferably, 8 carbon atoms.

In the aralkyl group contained in $R^{101}$ and $R^{102}$, saturated hydrocarbon chains are desirably present at the α-position and β-position of the nitrogen atom. In that case, a hydroxyl group may be present at the β-position of a nitrogen atom.

In $R^{101}$ and $R^{102}$, a hydroxyl group is desirably not present at the α-position of a nitrogen atom, one hydroxyl group is desirably present at the least the β-position of a nitrogen atom, and a single hydroxyl group is preferably present at the β-position of a nitrogen atom. The presence of a hydroxyl group at the β-position of a nitrogen atom can facilitate synthesis and enhance solubility in organic solvents.

Each of $R^{101}$ and $R^{102}$ independently preferably denotes an alkyl group comprising at least one hydroxyl group and 2 to 22 carbon atoms, an aralkyl group comprising at least one hydroxyl group and 8 to 22 carbon atoms, an alkoxyalkyl group comprising at least one hydroxyl group and 3 to 22 carbon atoms, or an aryloxyalkyl group comprising at least one hydroxyl group and 9 to 22 carbon atoms. An alkyl group comprising at least one hydroxyl group and 2 to 20 carbon atoms, an aralkyl group comprising at least one hydroxyl group and 8 to 20 carbon atoms, an alkoxyalkyl group comprising at least one hydroxyl group and 3 to 20 carbon atoms, or an aryloxyalkyl group comprising at least one hydroxyl group and 9 to 20 carbon atoms is preferred.

Specific examples of alkyl groups comprising at least one hydroxyl group and equal to or more than two carbon atoms are: 2-hydroxyethyl groups, 2-hydroxypropyl groups, 2-hydroxybutyl groups, 2-hydroxypentyl groups, 2-hydroxyhexyl groups, 2-hydroxyoctyl groups, 2-hydroxy-3-methoxypropyl groups, 2-hydroxy-3-ethoxypropyl groups, 2-hydroxy-3-butoxypropyl groups, 2-hydroxy-3-phenoxypropyl groups, 2-hydroxy-3-methoxybutyl groups, 2-hydroxy-3-methoxy-3-methylbutyl groups, 2,3-dihydroxypropyl groups, 3-hydroxypropyl groups, 3-hydroxybutyl groups, 4-hydroxybutyl groups, 1-methyl-2-hydroxyethyl groups, 1-ethyl-2-hydroxyethyl groups, 1-propyl-2-hydroxyethyl groups, 1-butyl-2-hydroxyethyl groups, 1-hexyl-2-hydroxyethyl groups, 1-methoxymethyl-2-hydroxyethyl groups, 1-ethoxymethyl-2-hydroxyethyl groups, 1-butoxymethyl-2-hydroxyethyl groups, 1-phenoxymethyl-2-hydroxyethyl groups, 1-(1-methoxyethyl)-2-hydroxyethyl groups, 1-(1-methoxy-1-methylethyl)-2-hydroxyethyl groups, and 1,3-dihydroxy-2-propyl groups. Of these, 2-hydroxybutyl groups, 2-hydroxy-3-methoxypropyl groups, 2-hydroxy-3-butoxypropyl groups, 2-hydroxy-3-phenoxypropyl groups, 1-methyl-2-hydroxyethyl groups, 1-methoxymethyl-2-hydroxyethyl groups, 1-butoxymethyl-2-hydroxyethyl groups, and 1-phenoxyethyl-2-hydroxyethyl groups are desirable examples.

Specific examples of aralkyl groups comprising at least one hydroxyl group and equal to or more than eight carbon atoms are: 2-hydroxy-2-phenylethyl groups, 2-hydroxy-2-phenylpropyl groups, 2-hydroxy-3-phenylpropyl groups, 2-hydroxy-2-phenylbutyl groups, 2-hydroxy-4-phenylbutyl groups, 2-hydroxy-5-phenylpentyl groups, 2-hydroxy-2-(4-methoxyphenyl)ethyl groups, 2-hydroxy-2-(4-phenoxyphenyl)ethyl groups, 2-hydroxy-2-(3-methoxyphenyl)ethyl groups, 2-hydroxy-2-(4-chlorophenyl)ethyl groups, 2-hydroxy-2-(4-hydroxyphenyl)ethyl groups, 2-hydroxy-3-(4-methoxyphenyl)propyl groups, 2-hydroxy-3-(4-chlorophenyl)propyl groups, 1-phenyl-2-hydroxyethyl groups, 1-methyl-1-phenyl-2-hydroxyethyl groups, 1-benzyl-2-hydroxyethyl groups, 1-ethyl-1-phenyl-2-hydroxyethyl groups, 1-phenethyl-2-hydroxyethyl groups, 1-phenylpropyl-2-hydroxyethyl groups, 1-(4-methoxyphenyl)-2-hydroxyethyl groups, 1-(4-phenoxyphenyl)-2-hydroxyethyl groups, 1-(3-methoxyphenyl)-2-hydroxyethyl groups, 1-(4-chlorophenyl)-2-hydroxyethyl groups, 1-(4-hydroxyphenyl)-2-hydroxyethyl groups, and 1-(4-methoxyphenyl)-3-hydroxy-2-propyl groups. Of these, 2-hydroxy-2-phenylethyl groups and 1-phenyl-2-hydroxyphenyl groups are desirable examples.

In general formula (2), $M^1$ denotes a hydrogen atom or a cation.

The cation may be an inorganic cation or an organic cation. The cation electrically neutralizes the —$SO_3^-$ in general formula (2). It is not limited to a monovalent cation, and can be a divalent or greater cation. A monovalent cation is desirable. When the valence of the cation denoted by $M^1$ is given by n, $M^1$ denotes (1/n) moles of the cation relative to the compound denoted by general formula (2).

The inorganic cation is not specifically limited; desirable examples are alkali metal ions and alkaline earth metal ions. Alkali metal ions are preferred examples, and $Li^+$, $Na^+$, $K^+$, $Rb^+$, and $Cs^+$ are examples of greater preference.

Examples of organic cations are ammonium ions, quaternary ammonium ions, and pyridinium ions.

The above $M^1$ is desirably a hydrogen atom or an alkali metal ion, preferably a hydrogen atom, $Li^+$, $Na^+$, or $K^+$, and further preferably, $K^+$.

The compound denoted by general formula (2) may comprise one or more aromatic ring within the molecule to enhance solubility in organic solvents.

In general formula (2), $R^{101}$ and $R^{102}$ may be identical or different, but are desirably identical to facilitate synthesis.

In formula (2), each of $R^{101}$ and $R^{102}$ desirably denotes a group with equal to or more than five carbon atoms. In general formula (2), each of $R^{101}$ and $R^{102}$ is desirably a group comprising an aromatic ring and/or an ether bond.

Reference can be made to Japanese Unexamined Patent Publication (KOKAI) No. 2009-96798, which is expressly incorporated herein by reference in its entirety, for the details of the above-described polyol compound denoted by general formula (2). In particular, reference can be made to [0028], [0029] [0045] and Examples of Japanese Unexamined Patent Publication (KOKAI) No. 2009-96798, for the synthesis method of the polyol compound denoted by general formula (2). In addition, examples of the polyol compound denoted by general formula (2) include the compounds denoted by general formulas (2) and (3) described in Japanese Unexamined Patent Publication (KOKAI) No. 2009-96798, and details thereof are described in [0030] to [0034] of Japanese Unexamined Patent Publication (KOKAI) No. 2009-96798. Specific examples of the polyol compound denoted by general formula (2) are the following Example compounds (S-1) to (S-70) described in Japanese Unexamined Patent Publication (KOKAI) No. 2009-96798 and the following Example compounds (S-71) to (S-74). In Example compounds below, "Ph" denotes a phenyl group and "Et" denotes an ethyl group.

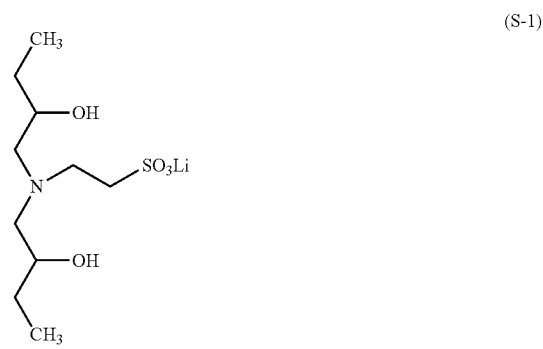

(S-1)

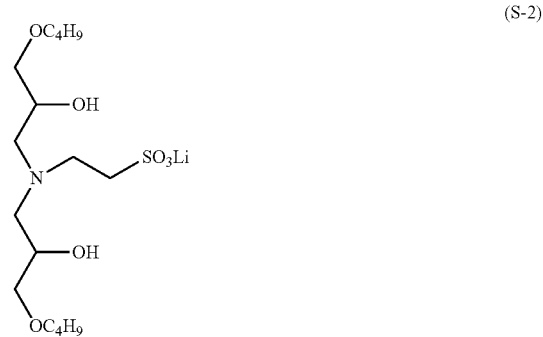

(S-2)

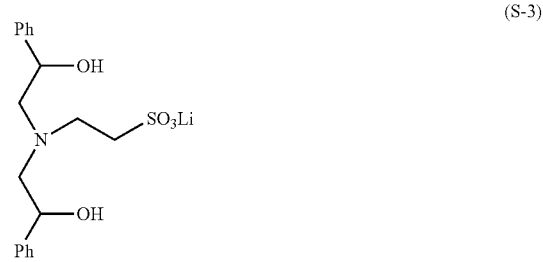

(S-3)

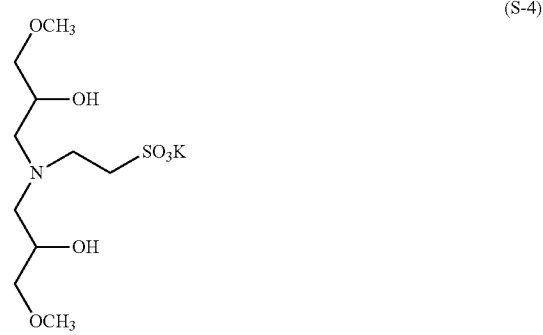

(S-4)

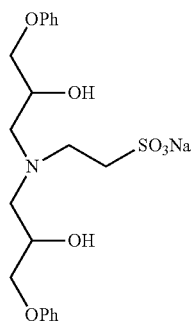 (S-5)
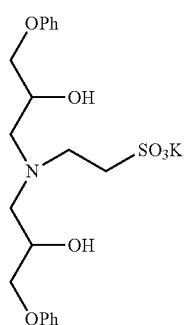 (S-6)
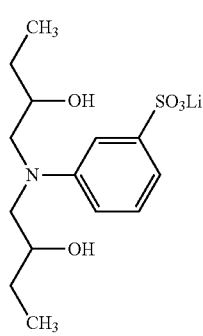 (S-7)
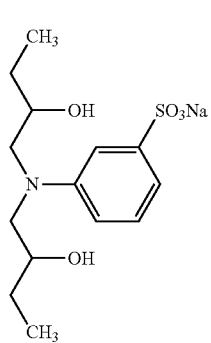 (S-8)
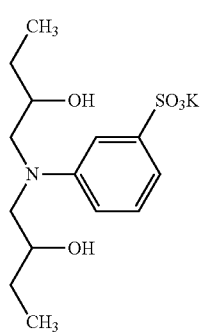 (S-9)

(S-15) 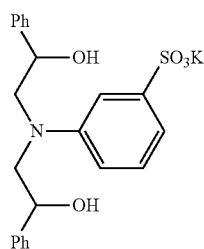
(S-16) 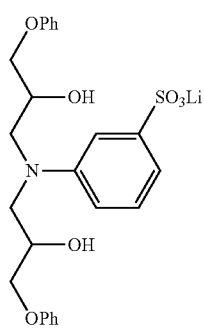
(S-17) 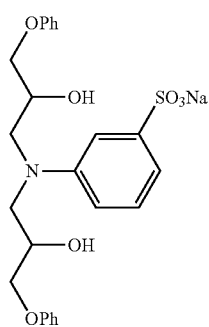
(S-18) 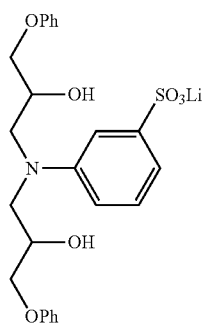
(S-19) 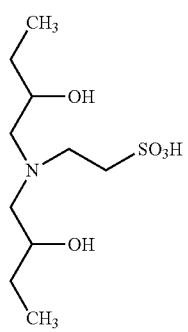
(S-20) 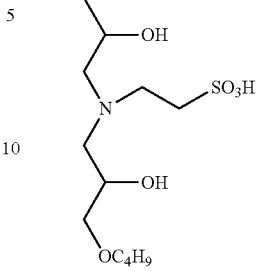
(S-21) 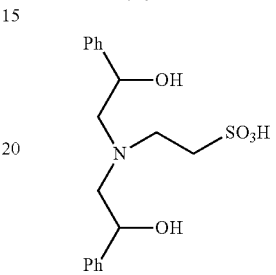
(S-22) 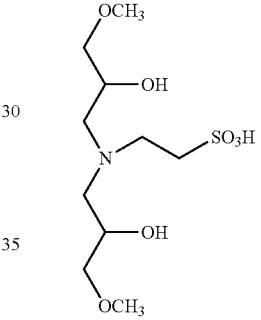
(S-23) 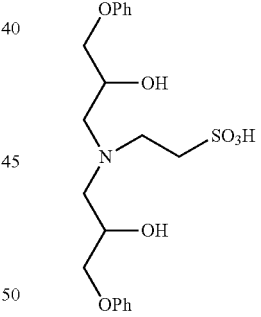
(S-24) 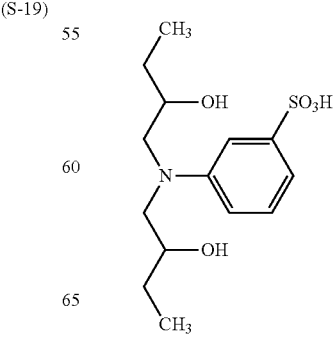

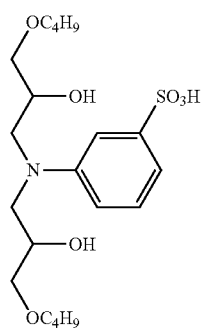 (S-25)
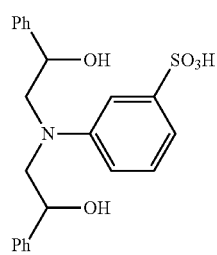 (S-26)
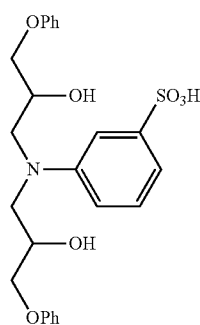 (S-27)
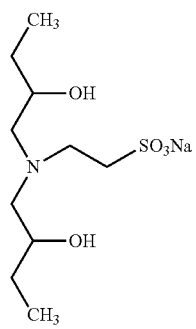 (S-28)
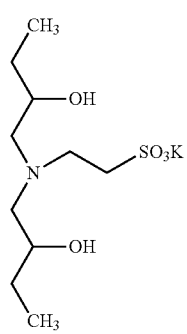 (S-29)
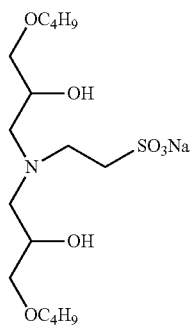 (S-30)
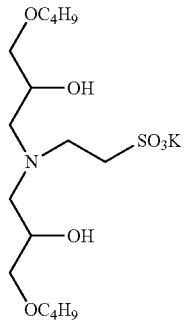 (S-31)
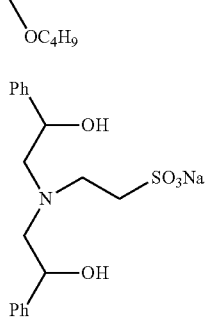 (S-32)
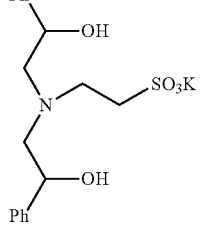 (S-33)
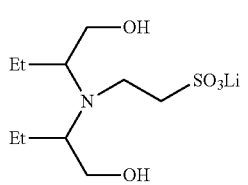 (S-34)
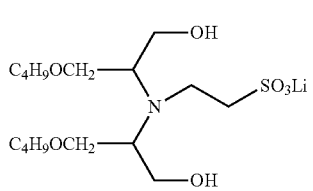 (S-35)

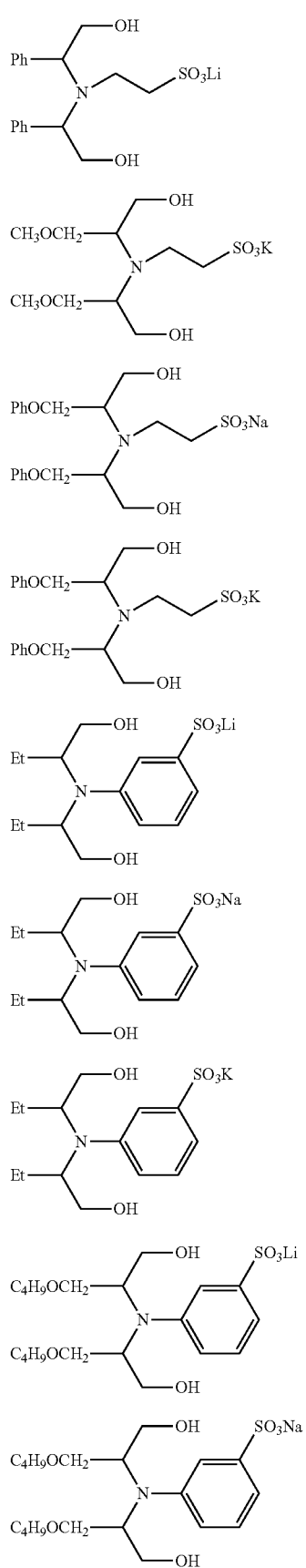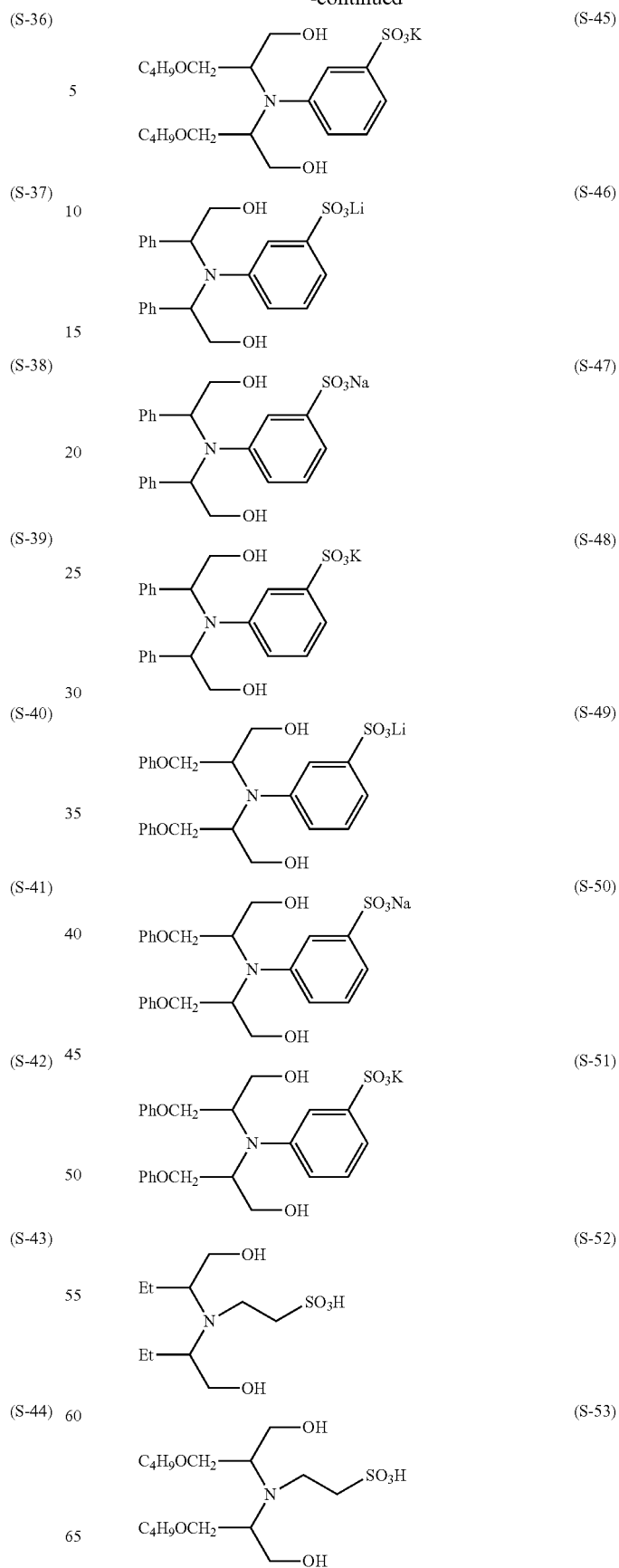

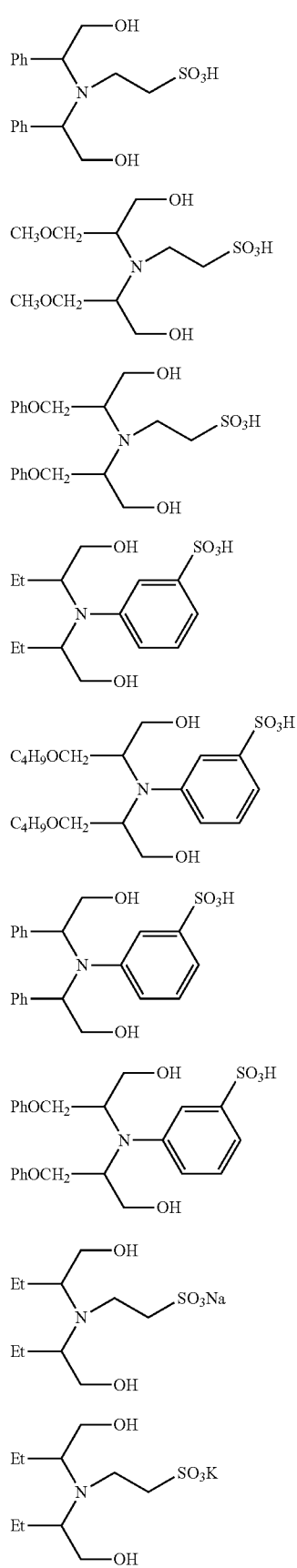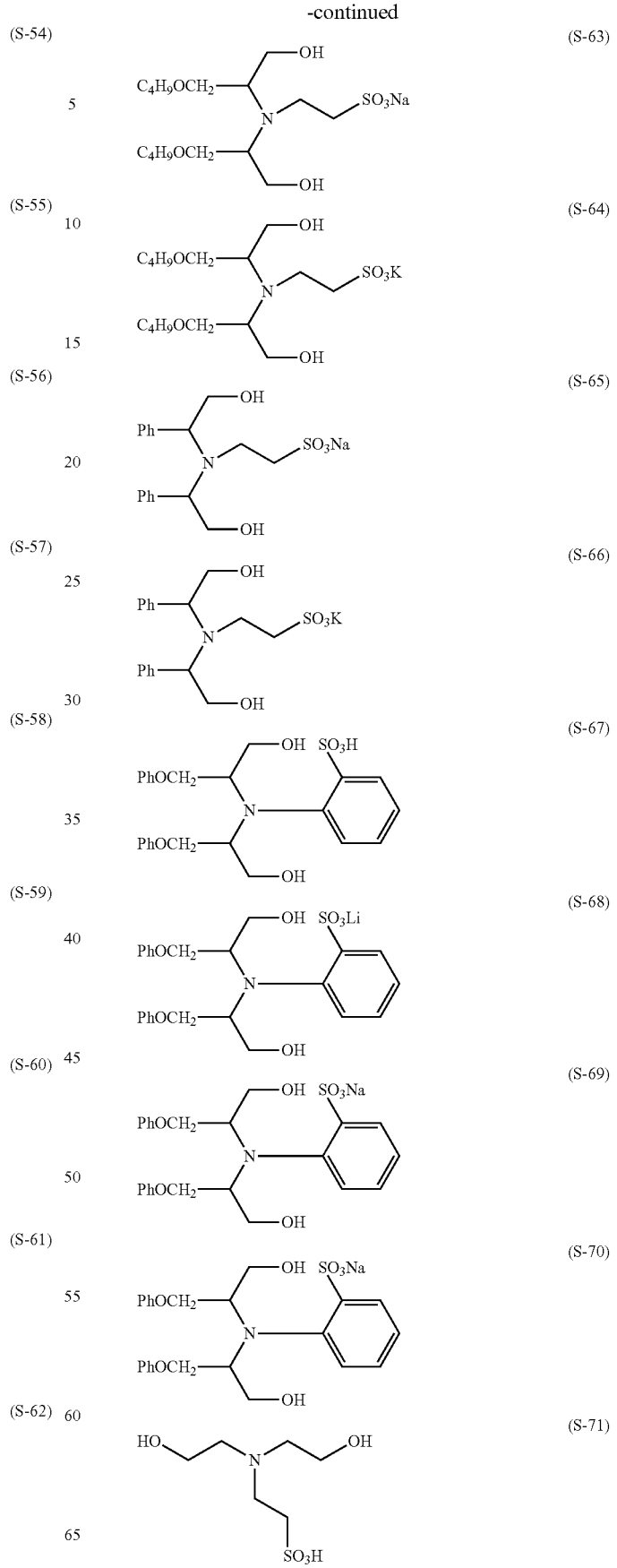

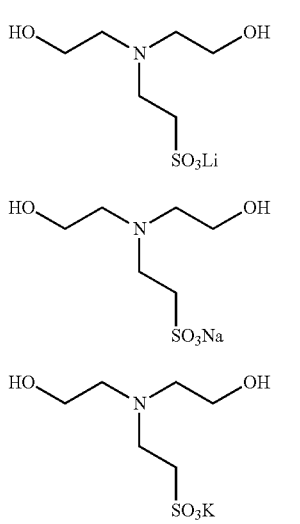

(S-72)

(S-73)

(S-74)

In addition to the polyol compound denoted by general formula (2), known polyol compounds that are commonly employed as chain-extending agents in polyurethane synthesis, such as polyester polyols, polyether polyols, polyether-ester polyols, polycarbonate polyols, polyolefin polyols, and dimer diols, can be employed the synthesis starting material of Polyurethane resin A. Reference can be made to [0056] to [0065] of Japanese Unexamined Patent Publication (KOKAI) No. 2009-96798, for polyol compounds that can be employed together. The fluorene-derived alcohol denoted by the following formula can also be employed.

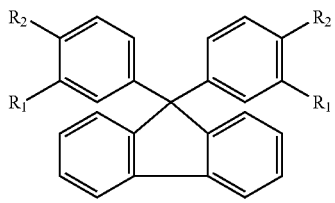

(In the formula, $R_1$ denotes H or $CH_3$, $R_2$ denotes OH or —$OCH_2CH_2OH$, and the two instances of $R_1$ and of $R_2$ may be identical or different.)

Polyurethane resin A can be obtained by subjecting an isocyanate compound and a polyol compound to a urethane-forming reaction. The starting materials can be dissolved in a solvent (polymerization solvent); and heating, pressurization, and nitrogen-backfilling can be conducted as needed to facilitate the urethane-forming reaction. The usual reaction conditions for conducting a urethane-forming reaction can be adopted for the reaction temperature, reaction time, and other reaction conditions of the urethane-forming reaction. Reference can be made to, for example, [0067], [0068] and Examples of Japanese Unexamined Patent Publication (KOKAI) No. 2009-96798, for the urethane-forming reaction.

The term "isocyanate compound" means a compound having an isocyanate group. The use of a bifunctional or greater polyfunctional isocyanate compound (referred to as a "polyisocyanate" hereinafter) is desirable. Polyisocyanates that can be employed as the synthesis starting material of Polyurethane resin B are not specifically limited; any known polyisocyanate can be employed. For example, diisocyanates such as trilene diisocyanate (TDI), diphenylmethane diisocyanate (MDI), p-phenylene diisocyanate, o-phenylene diisocyanate, m-phenylene diisocyanate, xylylene diisocyanate, hydrogenated xylylene diisocyanate, and isophorone diisocyanate can be employed. One isocyanate compound may be employ singly or two or more isocyanate compounds may be employed in combination.

Polyurethane resin A is a radiation-curable polyurethane resin and thus comprises radiation-curable functional groups. The radiation-curable functional group that is present in Polyurethane resin B can be any functional group that undergoes a curing reaction (crosslinking reaction) when irradiated with radiation; it is not specifically limited. From the perspective of reactivity, a group with a radical polymerizable carbon-carbon double bond is desirable and an acrylic double bond group is preferred. Of these, from the perspective of reactivity, a (meth)acryloyloxy group is desirable.

The radiation-curable functional group can be contained in either an isocyanate compound or a polyol compound, or in both. Taking into account the availability and cost of starting materials, the use of a polyol compound containing a radiation-curable functional group as a polyol compound is desirable.

Diols having at least one acrylic double bond per molecule, such as glycerin monoacrylate (also known as glycerol acrylate), glycerin monomethacrylate (also known as glycerol methacrylate) (such as Blemmer GLM, a trade name of NOF Corp.), and bisphenol A epoxyacrylate (such as Epoxyester 3000A, a trade name of Kyoeisha Chemical Co., Ltd.), are suitable as the polyol compound comprising a radiation-curable functional group. Among these diols, the compound indicated below (glycerin mono(meth)acrylate) is desirable from the perspective of curability. Below, R denotes a hydrogen atom or methyl group.

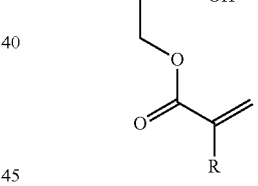

The various physical properties of Polyurethane resin A will be described next.

(a) Average Molecular Weight

The weight average molecular weight of Polyurethane resin A is desirably equal to or greater than 10,000 and equal to or less than 500,000 (in the present invention, "equal to or greater than 10,000 and equal to or less than 500,000" is also denoted as "10,000 to 500,000"; identical below), preferably 10,000 to 400,000, and more preferably, 10,000 to 300,000. A weight average molecular weight of equal to or higher than 10,000 is desirable in that the resulting storage property of the coating layer formed using Polyurethane resin A as binder can be good. Further, a weight average molecular weight of equal to or lower than 500,000 is desirable in that good dispersibility can be achieved.

For example, the weight average molecular weight can be adjusted to within the desired range by microadjusting the mole ratio of glycol-derived OH groups to diisocyanate-derived NCO groups and through the use of reaction catalysts. The weight average molecular weight can be further adjusted by adjusting the solid component concentration during the reaction, the reaction temperature, the reaction solvent, the reaction time, and the like.

The molecular weight distribution (Mw/Mn) of Polyurethane resin A is desirably 1.00 to 5.50, preferably 1.01 to 5.40. A molecular weight distribution of equal to or lower than 5.50 is desirable in that the composition distribution is low and good dispersibility can be achieved.

(b) Urethane Group Concentration

The urethane group concentration of Polyurethane resin A is desirably 2.0 to 5.0 mmole/g, preferably 2.1 to 4.5 mmole/g.

A urethane group concentration of equal to or higher than 2.0 mmole/g is desirable in that the glass transition temperature (Tg) can be high, a coating with good durability can be formed, and dispersibility can be good. A urethane group concentration of equal to or lower than 5.0 mmole/g is desirable in that good solvent solubility can be achieved, the polyol content can be adjusted, and the molecular weight can be readily controlled.

(c) Glass Transition Temperature

The glass transition temperature (Tg) of Polyurethane resin A is desirably 10 to 180° C., preferably 10 to 170° C. A glass transition temperature of equal to or higher than 10° C. is desirable in that a strong coating can be formed by radiation curing and a coating of good durability and storage properties can be obtained. The glass transition temperature of Polyurethane resin A is desirably equal to or lower than 180° C. in that calendering moldability can be good and a magnetic recording medium with good electromagnetic characteristics can be obtained. The glass transition temperature (Tg) of the radiation-cured layer formed by curing with radiation the radiation-curable composition containing Polyurethane resin A is desirably 30 to 200° C., preferably 40 to 160° C. The glass transition temperature is desirably equal to or higher than 30° C. in that good coating strength can be achieved as well as durability and storage properties can be improved. In addition, coating films in magnetic recording media desirably have a glass transition temperature of equal to or lower than 200° C. in that calendering moldability and electromagnetic characteristics can be good.

(d) Polar Group Content

Polyurethane resin A contains a sulfonic acid (salt) group because it has been obtained with the starting materials containing a sulfonic acid (salt) group-containing polyol compound, as described above. In addition to the sulfonic acid (salt) group, Polyurethane resin A can contain other polar groups. Examples of other polar groups are hydroxyalkyl groups, carboxylic acid (salt) groups, sulfuric acid (salt) groups, and phosphoric acid (salt) groups, with $-OSO_3M'$, $-PO_3M'_2$, $-COOM'$, and $-OH$ being desirable. Of these, $-OSO_3M'$ is preferred. M' denotes a hydrogen atom or monovalent cation. Examples of monovalent cations are alkali metals and ammonium. The content of polar groups in Polyurethane resin A is desirably 1.0 to 3.500 mmole/kg, preferably 1.0 to 3.000 mmole/kg, more preferably 1.0 to 2.500 mmole/kg.

The concentration of polar groups is desirably equal to or higher than 1.0 mmole/kg in that adequate adsorbability to the nonmagnetic powder can be imparted and dispersibility can be good. The concentration of polar groups is desirably equal to or lower than 3.500 mmole/kg in that good solubility in solvent can be achieved.

(e) Hydroxyl Group Content

Hydroxyl groups (OH groups) can also be incorporated into Polyurethane resin A. The number of OH groups incorporated is desirably 1 to 100,000, preferably 1 to 10,000, per molecule. When the number of hydroxyl groups lies within this range, good dispersion can be achieved due to enhanced solubility in solvent.

(f) Radiation-Curable Functional Group Content

The details of the radiation-curable functional groups contained in Polyurethane resin A are as set forth above. The content thereof is desirably 1.0 to 4.000 mmole/kg, preferably 1.0 to 3.000 mmole/kg, and more preferably, 1.0 to 2.000 mmole/kg. A radiation-curable functional group content of equal to or higher than 1.0 mmole/kg is desirable in that a strong coating can be formed by radiation curing. A radiation-curable functional group content of equal to or lower than 4.000 mmole/kg is desirable in that good calendering moldability can be achieved and a magnetic recording medium with good electromagnetic characteristics can be obtained.

Radiation-Curable Vinyl Chloride Copolymer

The binder component contained in the radiation-curable composition for forming the nonmagnetic layer can be only the above-described Polyurethane resin A. In order to form a high-strength coating film, Polyurethane resin A can be employed together with a radiation-curable vinyl chloride copolymer. The radiation-curable vinyl chloride copolymer employed together desirably has a structural unit denoted by general formula (1):

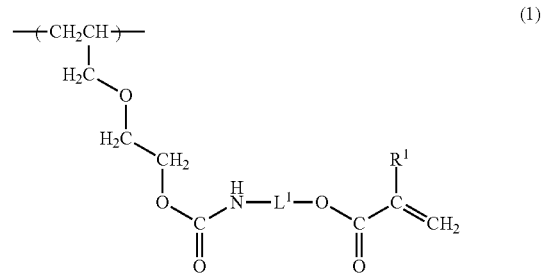

wherein, in general formula (1), $R^1$ denotes a hydrogen atom or a methyl group, and $L^1$ denotes a divalent linking group denoted by formula (2), formula (3), or general formula (4):

wherein, in general formula (4), $R^{41}$ denotes a hydrogen atom or a methyl group.

The radiation-curable vinyl chloride copolymer having the structural unit denoted by general formula (1) can exhibit good curability when exposed to radiation. The high curability is attributed to the fact that the radiation-curable functional groups incorporated are highly reactive and the structure has adequate flexibility. That is, the present inventors presume that in the structure denoted by general formula (1), the fact that the (meth)acryloyloxy group enclosed in the round frame was a particularly highly reactive group among various radiation-curable functional groups, and the fact that the portion linking it to the main chain enclosed in the square frame had adequate flexibility to allow the formation of a crosslinked structure are why the radiation-curable vinyl chloride copolymer could exhibit good curability when exposed to radiation. In contrast, it is thought that, even though resins in which highly reactive radiation-curable functional groups have been incorporated have structures that are rigid, the radiation-curable functional groups are unable to adequately approach each other, making it difficult for a crosslinked structure to form.

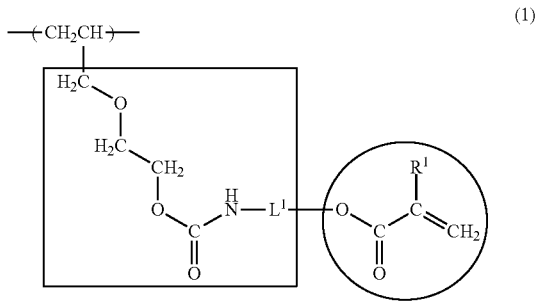

(1)

(Details of formula (1) will be described further below.)

The above radiation-curable vinyl chloride polymer (also referred to as the "Copolymer B", hereinafter) will be described in detail below.

Copolymer B is a vinyl chloride copolymer comprising a radiation-curable functional group that can undergo a curing (crosslinking) reaction when exposed to radiation. At least one of the radiation-curable functional groups is a (meth)acryloyloxy group comprised in the structural unit denoted by general formula (1). As stated above, it is presumed that in Copolymer B, a highly reactive (meth)acryloyloxy group is bonded to the main chain through a linking portion of suitable flexibility, thereby exhibiting high curability when exposed to radiation.

In the present invention, the term "(meth)acryloyloxy group" is to be construed as including both methacryloyloxy and acryloyloxy groups, and the term "(meth)acrylate is to be construed as including both methacrylate and acrylate.

Copolymer B can also comprise a group other than a (meth) acryloyloxy group as a radiation-curable functional group. Examples of such radiation-curable functional groups that are desirable in terms of reactivity are radical polymerizable carbon-carbon double-bond groups, with acrylic double-bond groups being preferred. In this context, the term "acrylic double-bond groups" refers to residues of acrylic acids, acrylic acid esters, amide acrylates, methacrylic acids, methacrylic acid esters, and amide methacrylates.

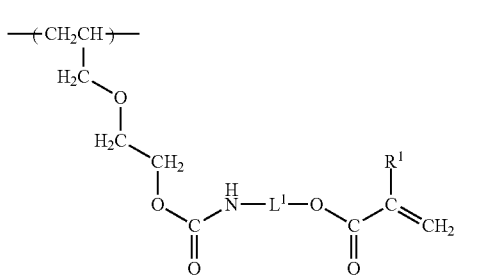

(1)

General formula (1) will be described in greater detail below.

In general formula (1), $R^1$ denotes a hydrogen atom or a methyl group. A high degree of curability can be achieved regardless of whether $R^1$ denotes a hydrogen atom or a methyl group. From the perspective of availability, $R^1$ desirably denotes a methyl group.

In general formula (1), $L^1$ denotes a divalent linking group denoted by formula (2), formula (3), or general formula (4), below. In general formula (4), $R^{41}$ denotes a hydrogen atom or a methyl group. From the perspective of availability, $R^{41}$ desirably denotes a hydrogen atom. Although varying with the system being employed, from the perspective of curability, the divalent linking groups denoted by formula (3) and general formula (4) are generally desirable. From the perspective of cost, the divalent linking groups denoted by formulas (2) and (3) are desirable.

$$—CH_2CH_2—, \quad (2)$$

$$—CH_2CH_2OCH_2CH_2—, \quad (3)$$

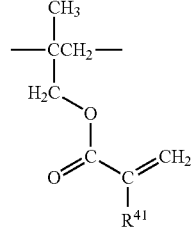

(4)

From the perspective of further increasing curability during exposure to radiation, the structural unit denoted by general formula (1) desirably constitutes equal to or more than one mole percent of all polymerizing units (100 mole percent) in Copolymer B. The upper limit of the content of the structural unit denoted by general formula (1) in Copolymer B is not specifically limited. However, by way of example, an adequate effect can be achieved at about equal to or less than 5 mole percent. In Copolymer B, the structural unit denoted by general formula (1) desirably constitutes equal to or more than 1 mole percent and equal to or less than 50 mole percent of all polymerizing units (100 percent). Incorporating the structural unit denoted by general formula (1) within the above range in Copolymer B makes it possible to achieve even higher curability.

Since Copolymer B is a vinyl chloride Copolymer B vinyl chloride-derived structural unit (the following structural unit) is contained along with the structural unit denoted by general formula (1).

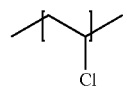

The content of the above structural unit derived from vinyl chloride in Copolymer B is not specifically limited. However, it desirably constitutes about 50 to 99 mole percent of all polymerizing units (100 mole percent).

Copolymer B can contain the structural unit denoted by general formula (5) below. The incorporation of the structural unit denoted by general formula (5) below can effectively enhance curability. Since the synthesis reaction of a copolymer containing the structural unit denoted by general formula (5) is uncomplicated, this structural unit is desirable in terms of synthesis suitability.

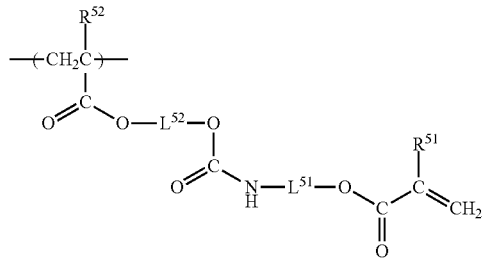

General formula (5) will be described below.

In general formula (5), each of $R^{51}$ and $R^{52}$ independently denotes a hydrogen atom or a methyl group. High curability can be achieved regardless of whether $R^{51}$ and $R^{52}$ denote hydrogen atoms or methyl groups. From the perspective of availability, $R^{51}$ and $R^{52}$ desirably denote methyl groups. In general formula (5), $L^{51}$ denotes the divalent linking group denoted by formula (2), formula (3), or general formula (4) described above.

In general formula (5), $L^{52}$ denotes a divalent linking group. The divalent linking group denoted by $L^{52}$ is desirably an alkyleneoxy group or alkylene group with 1 to 25 carbon atoms, preferably an alkyleneoxy group or alkylene group with 1 to 20 carbon atoms, and more preferably, a methylene group, ethylene group, propylene group, butylene group, ethyleneoxy group, diethyleneoxy group, or triethyleneoxy group. These groups may comprise substituents. In such cases, the number of carbon atoms refers to the number of carbon atoms of the moiety excluding substituents.

Desirable substituents that can be incorporated into $L^{52}$ are alkyl groups having 1 to 20 carbon atoms. Among these, alkyl groups with 1 to 15 carbon atoms are desirable, alkyl groups with 1 to 10 carbon atoms are preferred, and alkyl groups with 1 to 7 carbon atoms are of greater preference. Taking into account starting materials, suitability to synthesis, and the like, specific examples of optimal substituents are methyl groups, ethyl groups, branched or linear propyl groups, branched or linear butyl groups, branched or linear pentyl groups, and branched or linear hexyl groups.

In Copolymer B, it is possible to incorporate, for example, the structural unit denoted by general formula (5) in a proportion of equal to or more than 1 mole percent and equal to or less than 45 mole percent of all polymerizing units (100 mole percent). Incorporation of the structural unit denoted by general formula (5) within the above-stated range in Copolymer B can further enhance curability.

Copolymer B can comprise a cyclic ether structure. The incorporation of a cyclic ether structure can effectively enhance stability during copolymer synthesis and curability under a variety of conditions. A cyclic ether structure is also effective as a functional group for introducing a polar group into the copolymer. The cyclic ether structure is desirably an oxirane ring, oxetane ring, tetrahydrofuran ring, tetrahydropyran ring, or crown ether; preferably an oxirane ring, oxetane ring, tetrahydrofuran ring, or tetrahydropyran ring; and more preferably, an oxirane ring, oxetane ring, or tetrahydrofuran ring. The cyclic ether structure can be contained, for example, on a side chain portion of the Copolymer Bn example of a desirable embodiment is the incorporation of a cyclic ether structure into the structural unit denoted by general formula (8) below.

In general formula (8), for example, $L^8$ denotes a divalent linking group, such as an oxyalkylene group in the form of $—CH_2OCH_2—$. $R^8$ denotes a cyclic ether structure, the details of which are as set forth above.

From the perspective of enhancing curability, Copolymer B desirably comprises from 1 to 100 cyclic ether structures per molecule. The content of the structural unit denoted by general formula (8) above is, for example, desirably equal to or more than 1 mole percent and equal to or less than 45 mole percent of all polymerizing units (100 mole percent).

Polar groups are widely incorporated into magnetic recording medium binders to increase the dispersion of magnetic powder, nonmagnetic powder, and the like. Accordingly, from the perspective of suitability as a magnetic recording medium binder, the presence of a polar group in Copolymer B is desirable to enhance dispersibility. Examples of the polar group are hydroxyalkyl groups, carboxylic acid (salt) groups, sulfonic acid (salt) groups, sulfuric acid (salt) groups, and phosphoric acid (salt) groups. In the present invention, the term "sulfonic acid (salt) group" refers to substituents in which a in general formula (A) below denotes 0, including the sulfonic acid group ($—SO_3H$) and sulfonate groups such as $—SO_3Na$, $—SO_3Li$, and $—SO_3K$. Further, the term "sulfuric acid (salt) group" refers to substituents in which a in general formula (A) denotes 1, including the sulfuric acid group and sulfate groups in the same manner as above. The same applies to carboxylic acid (salt) groups, phosphoric acid (salt) groups, and the like.

$$*—(O)_a SO_3 M \quad\quad\quad (A)$$

In general formula (A), M denotes a hydrogen atom or a cation; the symbol "*" denotes a bond position; and a denotes 0 or 1. When a=0 as set forth above, the substituent denoted by general formula (A) is a sulfonic acid (salt) group. When a=1, the substituent denoted by general formula (A) is a sulfuric acid (salt) group.

The cation may be an inorganic cation or an organic cation. The cation electrically neutralizes the $—(O)_n SO_3^-$ in general formula (A); it is not limited to a monovalent cation, and may be a divalent or greater cation. The cation denoted by M is desirably a monovalent cation. When a cation of n-valence is employed, it means (1/n) mole of cations relative to the substituent denoted by general formula (A).

The inorganic cations are not specifically limited. Alkali metal ions and alkaline earth metal ions are desirable, alkali metal ions are preferred, and $Li^+$, $Na^+$, and $K^+$ are of greater preference.

Examples of organic ions are ammonium ions, quaternary ammonium ions, and pyridinium ions.

M desirably denotes a hydrogen atom, alkali metal ion, quaternary ammonium ion, or pyridinium ion; preferably denotes a hydrogen atom, $Li^+$, $Na^+$, $K^+$, tetraalkylammonium ion, or pyridinium ion; and more preferably denotes $K^+$, a tetraalkylammonium ion, or a pyridinium ion.

An example of an embodiment of Copolymer B containing a sulfuric acid (salt) group is one that comprises the structural unit denoted by general formula (6) below in which a sulfuric acid (salt) group has been substituted for the structural unit denoted by general formula (1).

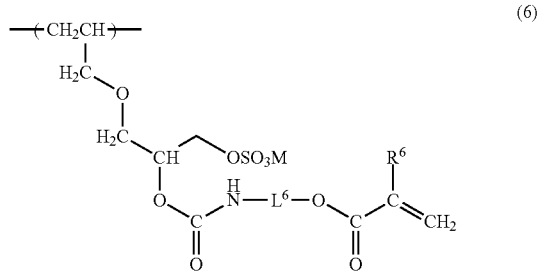

In general formula (6), M denotes a hydrogen atom or a cation. The details are as set forth for M in general formula (A).

In general formula (6), $R^6$ denotes a hydrogen atom or a methyl group; $L^6$ denotes the divalent linking group denoted by formula (2), formula (3), or general formula (4) described above. The details regarding $R^6$ and $L^6$ in general formula (6) are as set forth for $R^1$ and $L^1$ in general formula (1).

In Copolymer B, for example, a sulfonic acid (salt) group can be incorporated in the structural unit denoted by general formula (7).

In general formula (7), $R^7$ denotes a hydrogen atom or a methyl group, and $L^7$ denotes a divalent linking group, desirably an optionally branched alkylene group having 1 to 7 carbon atoms. The alkylene group may comprise a substituent. The details of the substituent are as set forth for the substituents contained in $L^2$.

In general formula (7), M denotes a hydrogen atom or a cation. The details are as set forth for M in general formula (A).

However, Copolymer B is not limited to those comprising structural unit (6) or (7). It can comprise a polar group such as a sulfonic acid (salt) group or sulfuric acid (salt) group at any position. A description of the quantity of polar groups contained in Copolymer B will be given further below.

The method of synthesizing Copolymer B will be described next.

Copolymer B is a vinyl chloride copolymer containing a structural unit denoted by general formula (1) derived from the vinyl monomer. Thus, it is synthesized by copolymerizing at least a vinyl chloride monomer and vinyl monomer for introducing the structural unit denoted by general formula (1). In the copolymerization reaction, for example, other monomers, such as monomers for introducing the structural units denoted by general formulas (5) to (8) can be copolymerized. Examples of specific embodiments of the synthesis reaction are:

(A-1) the method of conducting a copolymerization reaction employed a monomer having a radiation-curable functional group as a starting material monomer;

(A-2) the method of copolymerizing the starting material monomers of the vinyl chloride copolymer in the presence of a compound containing a radiation-curable functional group; and (A-3) the method of incorporating a radiation-curable functional group onto the side chain of a vinyl chloride copolymer by means of a polymer reaction.

These embodiments can be combined as needed to obtain Copolymer B.

The following monomers are examples of starting material monomers that can be employed in each of the above embodiments: vinyl chloride, vinylidene chloride, optionally substituted (meth)acrylic acid, optionally substituted alkyl(meth)acrylates, optionally substituted aryl(meth)acrylates, optionally substituted (meth)acrylamides, (meth)acryloyl morpholines, aromatic hydrocarbon rings comprising vinyl groups (various styrenes), heteroaromatic rings comprising vinyl groups (vinylcarbazoles), maleic anhydride, derivatives thereof, fatty acid vinyl esters (various acetoxyethylenes), various benzoyloxyethylenes, optionally substituted alkyl allyl ethers, (meth)acrylonitrile, (meth)crotonnitrile, ethylene, butadiene, itaconic acid esters, crotonic acid esters, and vinyl pyrrolidones. In the above, the term (meth)acrylic acid includes both acrylic acid and methacrylic acid. The same applies to all terms containing "(meth)."

The following monomers are examples of monomers that are desirable in terms of ease of the synthesis reaction: vinyl chloride, vinylidene chloride, optionally substituted (meth)acrylic acid, optionally substituted (cyclo)alkyl(meth)acrylates having 1 to 25 carbon atoms, optionally substituted aryl(meth)acrylates having 1 to 25 carbon atoms, (meth)acrylamide, optionally substituted secondary or tertiary (cyclo)alkyl(meth)acrylamides having 1 to 25 carbon atoms, optionally substituted secondary or tertiary aryl(meth)acrylamides having 1 to 25 carbon atoms, optionally substituted (meth)acryloylmorpholines having 1 to 25 carbon atoms, substituted or unsubstituted aromatic hydrocarbon rings having 1 to 25 carbon atoms and comprising vinyl groups, substituted or unsubstituted heteroaromatic rings having 1 to 25 carbon atoms and comprising vinyl groups, maleic anhydride, substituted or unsubstituted partially esterified maleic acid having 1 to 25 carbon atoms, substituted or unsubstituted partially amidated maleic acid having 1 to 25 carbon atoms, itaconic acid, optionally substituted itaconic acid (cyclo)alkyl esters having 1 to 25 carbon atoms, optionally substituted itaconic acid aryl esters having 1 to 25 carbon atoms, crotonic acid, optionally substituted crotonic acid (cyclo)alkyl esters having 1 to 25 carbon atoms, optionally substituted crotonic acid aryl esters having 1 to 25 carbon atoms, optionally substituted acetoxyethylenes having 1 to 25 carbon atoms, optionally substituted benzoyloxyethylenes having 1 to 25 carbon atoms, optionally substituted alkyl allyl ethers, (meth)acrylonitrile, (meth)crotonnitrile, ethylene, butadiene, and vinylpyrrolidone.

Of these, the following monomers are examples of desirable monomers: vinyl chloride, vinylidene chloride, (meth)acrylic acid, optionally substituted (cyclo)alkyl(meth)acrylates having 1 to 20 carbon atoms, optionally substituted aryl(meth)acrylates having 1 to 20 carbon atoms, (meth)acrylamides, optionally substituted secondary and tertiary (cyclo)alkyl(meth)acrylamides having 1 to 20 carbon atoms, optionally substituted secondary and tertiary aryl(meth)acrylamides having 1 to 20 carbon atoms, optionally substituted (meth)acryloylmorpholines having 1 to 20 carbon atoms, substituted or unsubstituted aromatic hydrocarbon rings comprising vinyl groups and having 1 to 20 carbon atoms, substituted or unsubstituted heteroaromatic rings comprising vinyl groups and having 1 to 20 carbon atoms, maleic anhydride, substituted or unsubstituted partially esterified maleic acid having 1 to 20 carbon atoms, substituted or unsubstituted partially amidated maleic acid having 1 to 20 carbon atoms, itaconic acid, optionally substituted itaconic acid (cyclo)alkyl esters having 1 to 20 carbon atoms, optionally substituted itaconic acid aryl esters having 1 to 20 carbon atoms, crotonic acid, optionally substituted crotonic acid (cyclo)alkyl esters having 1 to 20 carbon atoms, optionally substituted crotonic acid aryl esters having 1 to 20 carbon atoms, optionally substituted acetoxoyethylenes having 1 to 20 carbon atoms, optionally substituted benzoyloxyethylenes having 1 to 20 carbon atoms, optionally substituted alkyl allyl ethers having 1 to 20 carbon atoms, optionally substituted (meth)acrylonitriles having 1 to 20 carbon atoms, (meth) crotonnitrile, ethylene butadiene, and vinylpyrrolidone.

Of these, the following monomers are examples of preferred monomers: (meth)acrylic acid, optionally substituted methyl(meth)acrylates, ethyl(meth)acrylates, linear and branched propyl(meth)acrylates, linear and branched butyl (meth)acrylates, linear and branched pentyl(meth)acrylates, normal hexyl(meth)acrylate, cyclohexyl(meth)acrylate, normal heptyl(meth)acrylate, 2-ethyl hexyl(meth)acrylate, normal octyl(meth)acrylate, normal decyl(meth)acrylates, normal dodecyl(meth)acrylates, optionally substituted adamantyl(meth)acrylate, isobornyl(meth)acrylate, norbornane methyl(meth)acrylate, norbornene methyl(meth)acrylate, optionally substituted benzyl(meth)acrylate, naphthyl methyl(meth)acrylate, anthracene methyl(meth)acrylate, phenyl ethyl(meth)acrylate, optionally substituted phenyl (meth)acrylate, naphthyl(meth)acrylate, (meth)acrylamide, optionally substituted (di)methyl(meth)acrylamide, (di)ethyl (meth)acrylamide, linear and branched (di)propyl(meth) acrylamides, linear and branched (di)butyl(meth)acrylamides, linear and branched (di)pentyl(meth)acrylamide, (di) normal hexyl(meth)acrylamide, (di)cyclohexyl(meth) acrylamide, (di-)2-ethylhexyl(meth)acrylamide, optionally substituted adamantyl(meth)acrylamide, noradamantyl (meth)acrylamide, optionally substituted benzyl(meth)acrylamide, naphthyl ethyl(meth)acrylamide, phenyl ethyl(meth) acrylamide, optionally substituted (di)phenyl(meth) acrylamide, naphthyl(meth)acrylamide, (meth)acryloyl morpholine, piperidyl acrylamide, pyrrolidyl acrylamide, (α-methyl-)styrene, styrene sulfonic acid (salt), chloromethyl styrene, vinylpyridine, vinylimidazole, vinyltriazole, maleic anhydride, itaconic acid, crotonic acid, optionally substituted methyl crotonate, ethyl crotonate, linear and branched propyl crotonate, linear and branched butyl crotonate, linear and branched pentyl crotonate, normal hexyl crotonate, cyclohexyl crotonate, normal heptyl crotonate, 2-ethylhexyl crotonate, normal octyl crotonate, normal decyl crotonate, normal dodecyl crotonate, optionally substituted adamantyl crotonate, isobornyl crotonate, norbornane methyl crotonate, norbornene methyl crotonate, optionally substituted benzyl crotonate, naphthyl methyl crotonate, anthracene methyl crotonate, phenyl ethyl crotonate, optionally substituted phenyl crotonate, naphthyl crotonate, optionally substituted acetoxoyethylene, optionally substituted benzoyloxyethylene, 2-hydroxyethyl allyl ether, 2-hydroxypropyl allyl ether, 3-hydroxypropyl allyl ether, optionally substituted vinylcarbazole, vinylpyrrolidone, (meth)acrylonitrile, ethylene, butadiene, and (meth)crotonitrile.

Use of the following monomers is desirable from perspectives relating to suitability to use in magnetic recording media, such as solubility in solvents and coating suitability: methyl(meth)acrylate, ethyl(meth)acrylate, normal propyl (meth)acrylate, isopropyl(meth)acrylate, normal butyl(meth) acrylate, isobutyl(meth)acrylate, sec-butyl(meth)acrylate, normal pentyl(meth)acrylate, isopentyl(meth)acrylate, vinyl acetate, vinyl alcohol, 2-hydroxyethyl(meth)acrylate, polyethylene glycol(meth)acrylate, 2-hydroxypropyl(meth)acrylate, 3-hydroxypropyl(meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl(meth)acrylate, allyl glycidyl ether, phosphoethyl (meth)acrylate, sulfoethyl(meth)acrylate, p-styrene sulfonic acid, 2-acrylamide-2-methylpropanesulfonic acid, and metal salts such as Na salts and K salts, ammonium salts, and pyridine salts thereof.

Examples of copolymerizing monomers that can be employed are the above monomers into which radiation-curable functional groups have been incorporated. The details of the radiation-curable functional groups are as set forth above.

Other hydrophilic monomers may be suitably employed as the above copolymerizing monomers. Monomers comprising phosphoric acid, phosphoric acid esters, quaternary ammonium salt, ethyleneoxy chains, propyleneoxy chains, sulfonic acid, sulfuric acid groups, carboxylic acid groups, salts thereof (such as metal salts), morpholinoethyl groups, and the like can be employed.

Examples of substituents that can be present in the above-described monomer are those comprising partial structures in the form of alkyl groups, alkoxy groups, aryl groups, aryloxy groups, acyl groups, acyloxy groups, alkoxycarbonyl groups, aryloxycarbonyl groups, arylcarbonyl groups, amino groups dialkylamino groups, alkylamino groups, halogen atoms, hydroxyl groups, carboxyl groups, cyano groups, furyl groups, furfuryl groups, oxetane rings, oxirane rings, furan rings, tetrahydrofuran rings, tetrahydrofuryl rings, alkylthio groups, trimethylsilyl groups, trifluoromethyl groups, carboxyl groups, thienyl groups, morpholino groups, morpholinocarbonyl groups, —$OSO_3H$ groups, —$SO_3H$ groups, phosphoric acid, phosphonic acid, phosphinic acid, and the like.

The following are desirable as the above substituents: substituents having partial structures in the form of alkyl groups having 1 to 20 carbon atoms, alkoxy groups having 1 to 20 carbon atoms, aralkyl groups having 1 to 20 carbon atoms, aryl groups having 1 to 20 carbon atoms, aryloxy groups having 1 to 20 carbon atoms, acyloxy groups having 1 to 20 carbon atoms, acyl groups having 1 to 20 carbon atoms, alkoxycarbonyl groups having 1 to 20 carbon atoms, aryloxycarbonyl groups having 1 to 20 carbon atoms, arylcarbonyl groups having 1 to 20 carbon atoms, amino groups, dialkylamino groups having 1 to 20 carbon atoms, alkylamino groups having 1 to 20 carbon atoms, halogen atoms, hydroxyl groups, carboxyl groups, cyano groups, furyl groups, furfuryl groups, oxetane rings, oxirane rings, furan rings, tetrahydrofuran rings, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —$OSO_3H$ groups, —$SO_3H$ groups, phosphoric acid, phosphonic acid, and phosphinic acid; halogen atoms; and the like.

Of these, the following are preferred as the above substituents: substituents having partial structures in the form of alkyl groups having 1 to 15 carbon atoms, alkoxy groups having 1 to 15 carbon atoms, aralkyl groups having 1 to 15 carbon atoms, aryl groups having 1 to 15 carbon atoms, aryloxy groups having 1 to 15 carbon atoms, acyloxy groups having 1 to 15 carbon atoms, acyl groups having 1 to 15 carbon atoms, alkoxycarbonyl groups having 1 to 15 carbon atoms, aryloxycarbonyl groups having 1 to 15 carbon atoms, arylcarbonyl groups having 1 to 15 carbon atoms, amino groups, dialkylamino groups having 1 to 15 carbon atoms, alkylamino groups having 1 to 15 carbon atoms, halogen atoms, hydroxyl groups, carboxyl groups, cyano groups, furyl groups, furfuryl groups, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —$OSO_3H$ groups, —$SO_3H$ groups, phosphoric acid, phosphonic acid, and phosphinic acid; halogen atoms; and the like.

The following are particularly preferred as the above substituents: substituents having partial structures in the form of methyl groups, ethyl groups, linear or branched propyl groups, linear or branched butyl groups, linear or branched pentyl groups, normal hexyl groups, cyclohexyl groups, normal heptyl groups, 2-ethylhexyl groups, normal octyl groups, normal decyl groups, normal dodecyl groups, methyloxy groups, ethyloxy groups, linear or branched propyloxy groups, linear or branched butyloxy groups, linear or branched pentyloxy groups, normal hexyloxy groups, cyclohexyloxy groups, normal heptyloxy groups, 2-ethylhexyloxy group, normal octyloxy groups, normal decyloxy groups, normal dodecyloxy groups, benzyl groups, phenethyl groups, naphthylmethyl groups, napthylethyl groups, phenyl groups, naphthyl groups, phenyloxy groups, naphthyloxy groups, methylcarbonyloxy groups, ethylcarbonyloxy groups, linear or branched propylcarbonyloxy groups, linear or branched butylcarbonyloxy groups, linear or branched pentylcarbonyloxy groups, normal hexylcarbonyloxy groups, cyclohexylcarbonyloxy groups, normal heptylcarbonyloxy groups, 2-ethylhexylcarbonyloxy groups, normal octylcarbonyloxy groups, normal decylcarbonyloxy groups, normal dodecylcarbonyloxy groups, methylcarbonyl groups (acetyl groups), ethylcarbonyl groups, linear or branched propylcarbonyl groups, linear or branched butylcarbonyl groups, linear or branched pentylcarbonyl groups, normal hexylcarbonyl groups, cyclohexylcarbonyl groups, normal heptylcarbonyl groups, 2-ethylhexylcarbonyl groups, normal octylcarbonyl groups, normal decylcarbonyl groups, normal dodecylcarbonyl groups, methyloxycarbonyl groups, ethyloxycarbonyl groups, linear or branched propyloxycarbonyl groups, linear or branched butyloxycarbonyl groups, linear or branched pentyloxycarbonyl groups, normal hexyloxycarbonyl groups, cyclohexyloxycarbonyl groups, normal heptyloxycarbonyl groups, 2-ethylhexyloxycarbonyl groups, normal octyloxycarbonyl groups, normal decyloxycarbonyl groups, normal dodecyloxycarbonyl groups, benzoyl groups, naphthylcarbonyl groups, (di)methylamino groups, (di)ethylamino groups, linear or branched (di)propylamino groups, linear or branched (di)butylamino groups, linear or branched (di)pentylamino groups, (di)normal hexylamino groups, (di)cyclohexylamino groups, (di)normal heptylamino groups, (di)-2-ethylhexylamino groups, fluorine atoms, chlorine atoms, bromine atoms, hydroxyl groups, carboxyl groups, cyano groups, furyl groups, furfuryl groups, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —$OSO_3H$ groups, —$SO_3H$ groups, phosphoric acid, phosphonic acid, and phosphinic acid. Fluorine atoms, chlorine atoms, bromine atoms, and the like are preferred. These substituents may be further substituted with the above substituents.

The type and number of starting material monomers are not specifically limited other than that at least two monomers be employed in the form of vinyl chloride and a vinyl-based monomer for introducing the structural unit denoted by general formula (1). In addition to these two monomers, for example, 1 to 12 monomers may be employed, 1 to 10 monomers are desirably employed in combination, and 1 to 8 monomers are preferably employed in combination. In the blending of starting material monomers, it suffices to determine the composition of the copolymer desired. The content of the vinyl chloride monomer in the starting material monomers is desirably equal to or more than 60 weight percent and equal to or less than 95 weight percent in that good mechanical strength can be achieved, good solvent solubility can be attained, and a suitable solution viscosity can be achieved, resulting in good dispersion.

In embodiments (A-2) and (A-3) above, examples of the radiation-curable functional group-containing compound that is used to introduce a radiation-curable functional group are: (meth)acrylic acid, glycidyl(meth)acrylate, hydroxyalkyl(meth)acrylate, 2-isocyanatoethyl(meth)acrylate, 2-methacryloyloxyethyl isocyanate, 2-(2-isocyanate ethyloxy)ethyl methacrylate, 2-acryloyloxyethyl isocyanate, 1,1-bis(acryloyloxymethyl)ethyl isocyanate, and other compounds containing carbon-carbon double bond groups.

Taking into account ease of synthesis, cost, and availability of starting materials, the method of synthesizing Copolymer B is desirably embodiment (A-3), in which a polymer reaction is used to incorporate a radiation-curable functional group. The vinyl chloride copolymer employed in this embodiment is not specifically limited. A vinyl chloride copolymer comprising an active hydrogen group such as a hydroxyl group or a primary or secondary amine within the molecule is desirable in that a radiation-curable functional group can be readily introduced into the side chain by reaction with an isocyanate compound comprising a radiation-curable functional group. Such a vinyl chloride copolymer can be synthesized by known methods employing, for example, the above monomers that are capable of the copolymerization.

As set forth above, Copolymer B can comprise a polar group such as a sulfonic acid (salt) group. A single polar group, or two or more polar groups, can be incorporated. The incorporation of multiple polar groups is sometimes desirable in that, compared to when only a single polar group is incorporated, solubility in solvents such as cyclohexanone that are employed in the field of magnetic recording media is sometimes enhanced. The polar group can be introduced into Copolymer B by a known method such as copolymerization or an addition reaction. Further, a sulfonic acid (salt) group-containing vinyl chloride copolymer can be converted to another sulfonate group-containing vinyl chloride copolymer by salt exchange. Further, a known method can be employed to remove the salt and obtain sulfonic acid group-containing vinyl chloride copolymer.

The synthesis reaction and reactions incorporating the radiation-curable functional group or polar group to obtain Copolymer B can be conducted by dissolving the starting material compounds in a solvent (reaction solvent), and heating, pressurizing, substituting nitrogen, and the like as needed. Commonly employed reaction conditions can be employed as the conditions for the above reaction, such as the reaction temperature and duration of the reaction.

A known reaction catalyst can be employed in the above reaction. Examples are amine catalysts, organic tin catalysts, and organic bismuth catalysts. Examples of amine catalysts are: diethylene triamine, N-methyl morpholine, tetramethyl hexamethylene diamine, dimethyl formamide, dimethyl acetamide, and N-methylpyrrolidone. Examples of organic tin catalysts are dibutyltin dilaurate, dioctyltin dilaurate, dibutyltin didecanate, and dioctyltin didecanate. An example of an organic bismuth catalyst is bismuth tris(2-ethylhexanoate). An organic tin catalyst or an organic bismuth catalyst is desirably employed as the catalyst in the present invention.

The quantity of catalyst added is, for example, 0.00001 to 5 weight parts, desirably 0.0001 to 1 weight part, and preferably, 0.00001 to 0.1 weight part, relative to the total weight of the starting material compounds employed in the reaction.

A known solvent that is commonly employed in the above reactions can be selected as the reaction solvent. Examples are ketone solvents such as acetone, methyl ethyl ketone, and cyclohexanone; ester solvents such as methyl acetate, ethyl acetate, and ethyl lactate; ether solvents such as dioxane and tetrahydrofuran; aromatic solvents such as toluene and xylene; amide solvents such as N,N-dimethyl formamide, N,N-dimethyl acetamide, and N-methyl pyrrolidone; sulfoxide solvents such as dimethyl sulfoxide; methylene chloride; chloroform; and cyclohexane.

Following the synthesis reaction, purification and the like can be conducted by a known method as needed to obtain Copolymer B. The fact that the targeted copolymer has been obtained can be confirmed by a known identification method such as NMR. The use of methyl ethyl ketone, cyclohexanone, or a mixed solvent thereof, which are widely used in coating liquids for forming magnetic recording media, as the reaction solvent for the synthesis reaction makes it possible to employ the reaction solution following synthesis as is, or after adding an optional additive, as the coating liquid for forming a magnetic recording medium.

The various physical properties of Copolymer B will be described next.

(a) Average Molecular Weight, Molecular Weight Distribution

Copolymer B desirably has a weight average molecular weight of 10,000 to 500,000, preferably 10,000 to 400,000, and more preferably, 10,000 to 300,000. A weight average molecular weight of equal to or greater than 10,000 is desirable in that the storage property of a coating layer formed using Copolymer B as binder will be good. A weight average molecular weight of equal to or less than 500,000 is desirable in that good dispersion can be achieved.

The molecular weight distribution (weight average molecular weight Mw/number average molecular weight Mn) of Copolymer B is desirably 1.00 to 5.50, preferably 1.01 to 5.40. A molecular weight distribution of equal to or lower than 5.50 is desirable in that the composition distribution can be narrow and good dispersion can be achieved. The weight average molecular weight and molecular weight distribution (Mw/Mn) normally change little or not at all before and after the reaction introducing a radiation-curable functional group and/or a polar group into the vinyl chloride copolymer.

(b) Glass Transition Temperature

The glass transition temperature (Tg) of Copolymer B is desirably 10 to 180° C., preferably 10 to 170° C. A glass transition temperature of equal to or higher than 10° C. is desirable in that a strong coating can be formed by curing with radiation, yielding a coating of good durability and storage property. Copolymer B having a glass transition temperature of equal to or lower than 180° C. is desirable in that it can yield good calendering properties and thus can yield a magnetic recording medium with good electromagnetic characteristics.

(c) Polar Group Content

As set forth above, Copolymer B desirably comprises a polar group.

The content of the polar group in the radiation-curable vinyl chloride copolymer is desirably 1.0 to 3.500 mmol/kg, preferably 1.0 to 3.000 mmol/kg, and more preferably, 1.0 to 2.500 mmol.

A polar group content of equal to or higher than 1.0 mmol/kg is desirable in that adequate strength of adsorption to powder such as ferromagnetic powder and nonmagnetic powder can be achieved and good dispersion can be attained. A polar group content of equal to or lower than 3.500 mmol/kg is desirable in that good dissolution in solvent can be achieved. As set forth above, a polar group in the form of the sulfonic acid (salt) group or sulfuric acid (salt) group denoted by general formula (A) is desirable. The content of polar groups selected from the group consisting of sulfonic acid (salt) groups and sulfuric acid (salt) groups is desirably equal to or greater than 10 mmol/kg and equal to or less than 2.000 mmol/kg from the perspective of achieving both dispersion and solvent solubility.

(d) Hydroxyl Group Content

Copolymer B desirably contains hydroxyl (OH) groups. The number of hydroxyl groups contained is desirably 1 to 100,000, preferably 1 to 10,000, per molecule. When the number of hydroxyl groups falls within this range, solubility in solvent can increase and good dispersion can be achieved.

(e) Radiation-Curable Functional Group Content

Copolymer B contains a (meth)acryloyloxy group in the form of the radiation-curable functional group in the functional unit denoted by general formula (1), and can contain various other radiation-curable functional groups. The details of these radiation-curable functional groups are as set forth above. The content of the radiation-curable functional group in Copolymer B is desirably 1.0 to 4.000 mmol/kg, preferably 1.0 to 3.000 mmol/kg, and more preferably, 1.0 to 2.000 mmol/kg. A radiation-curable functional group content of equal to or higher than 1.0 mmol/kg is desirable in that a coating of high strength can be formed by radiation-curing. A radiation-curable functional group content of equal to or lower than 4.000 mmol/kg is desirable in that good calendering moldability can be achieved and thus a magnetic recording medium with good electromagnetic characteristics can be achieved.

Specific examples of Copolymer B are given below. However, the present invention is not limited to the specific examples below. The numbers positioned to the right of the various structural units below denotes mole ratios of the various structural units to all polymerizing units in the copolymer.

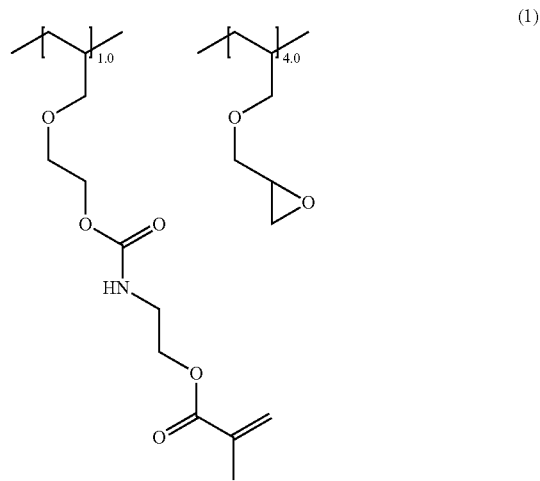

(1)

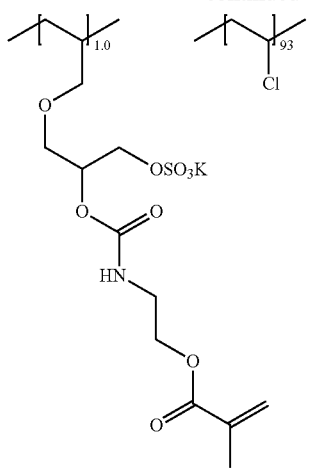
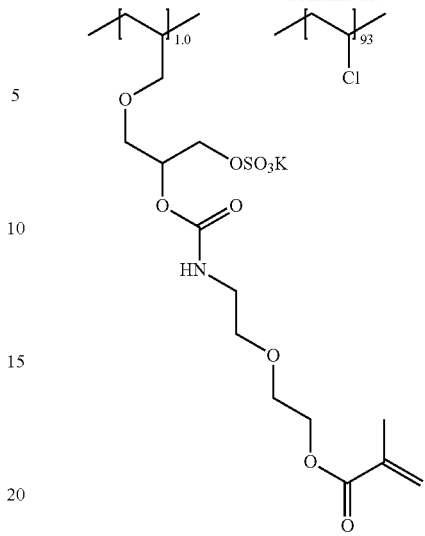
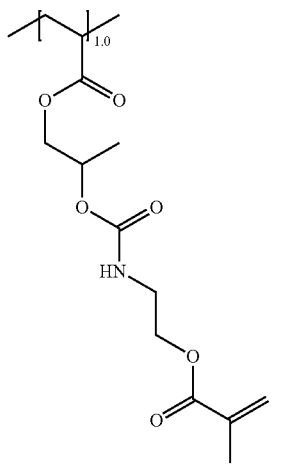
(mol %)
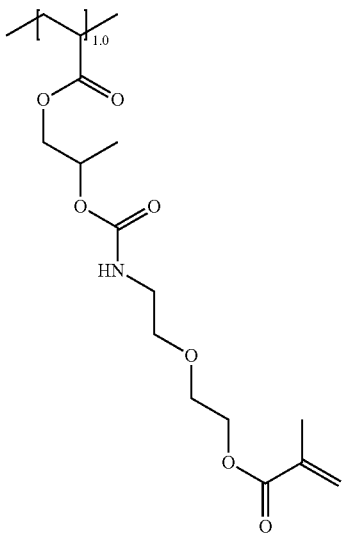
(mol %)
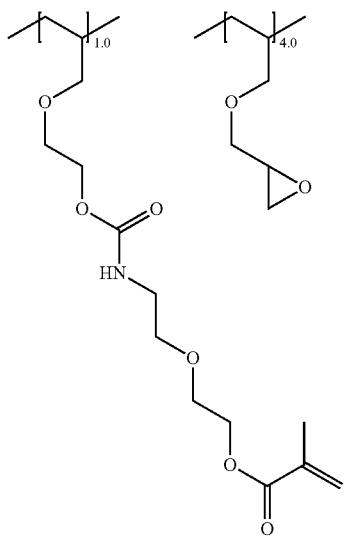
(2)
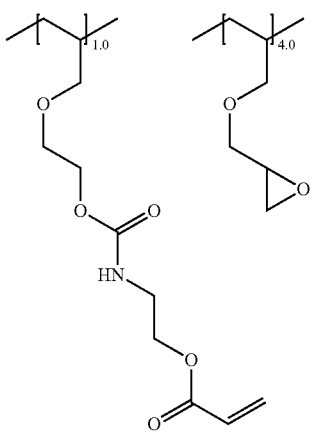
(3)

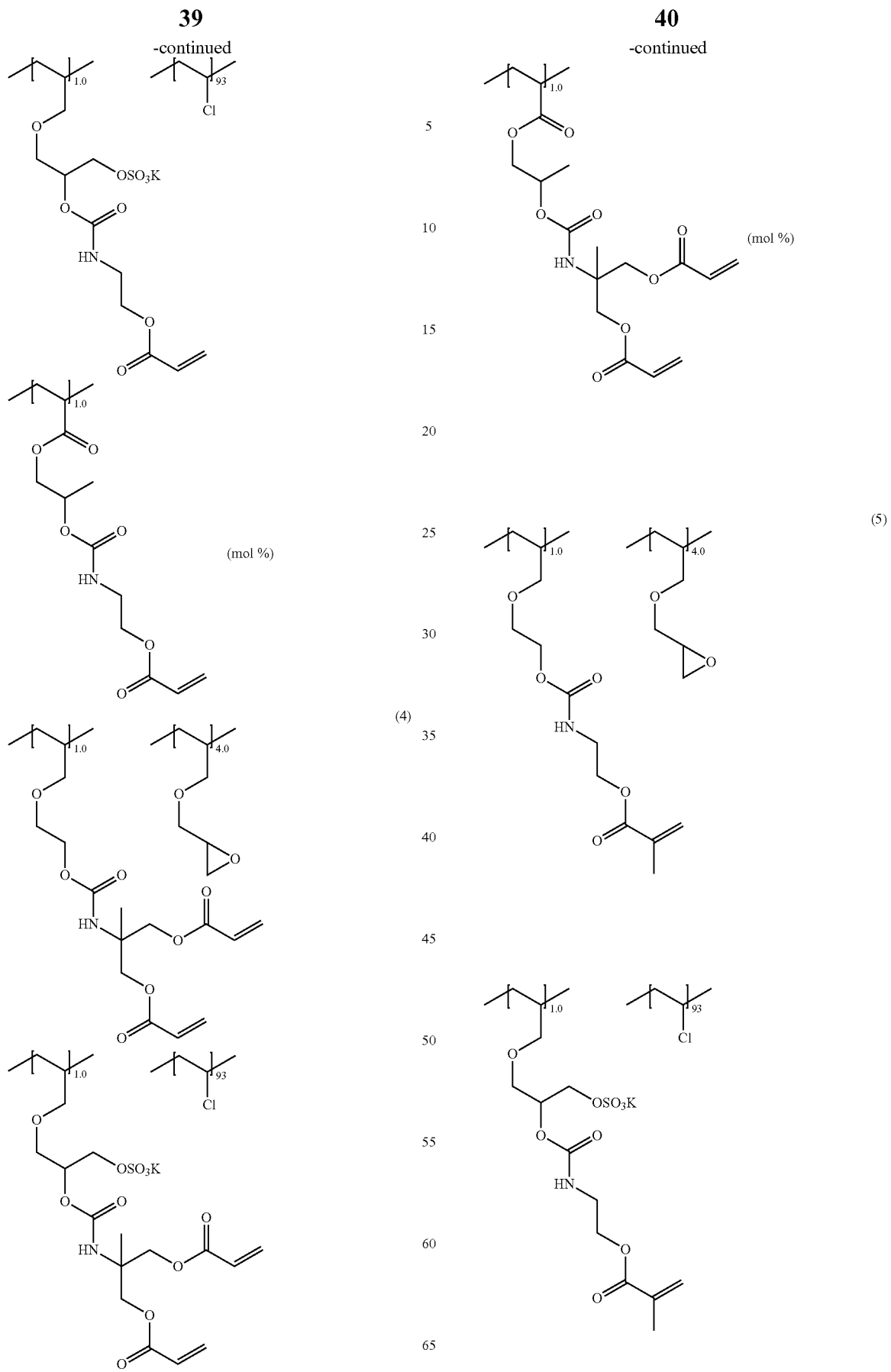

41
-continued
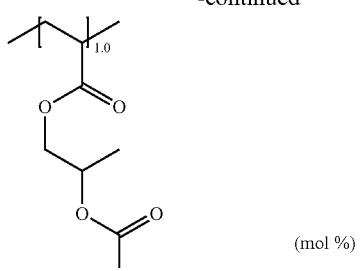
(mol %)
42
-continued
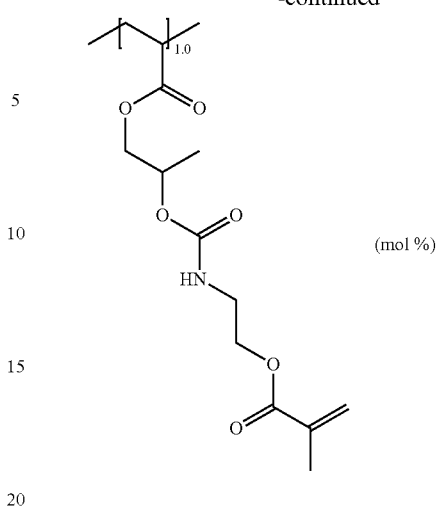
(mol %)
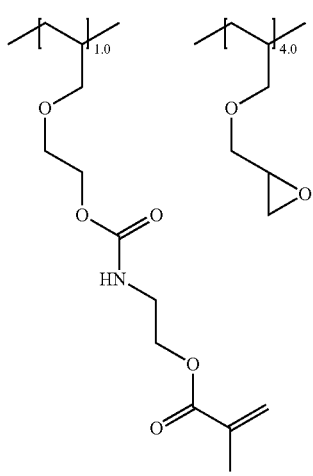
(6)
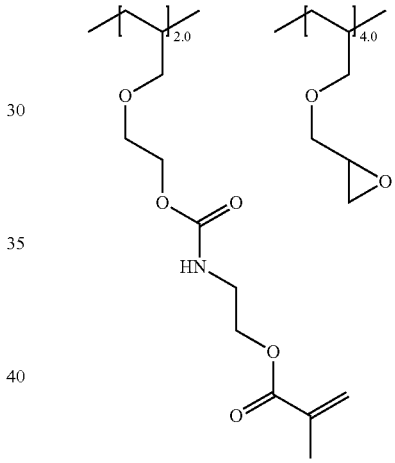
(7)
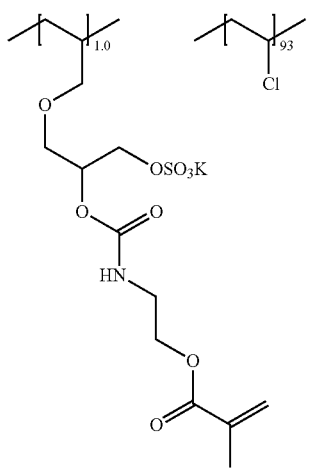
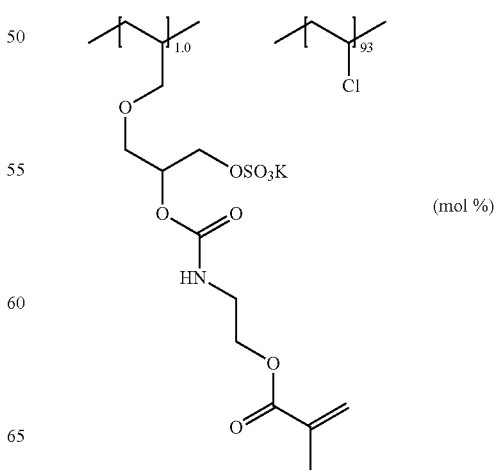
(mol %)

(8)

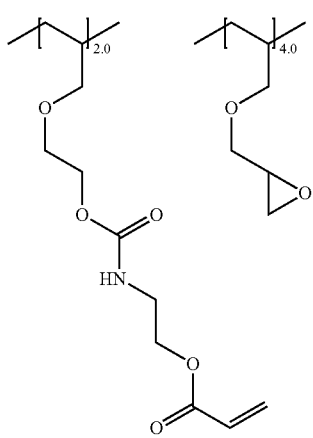

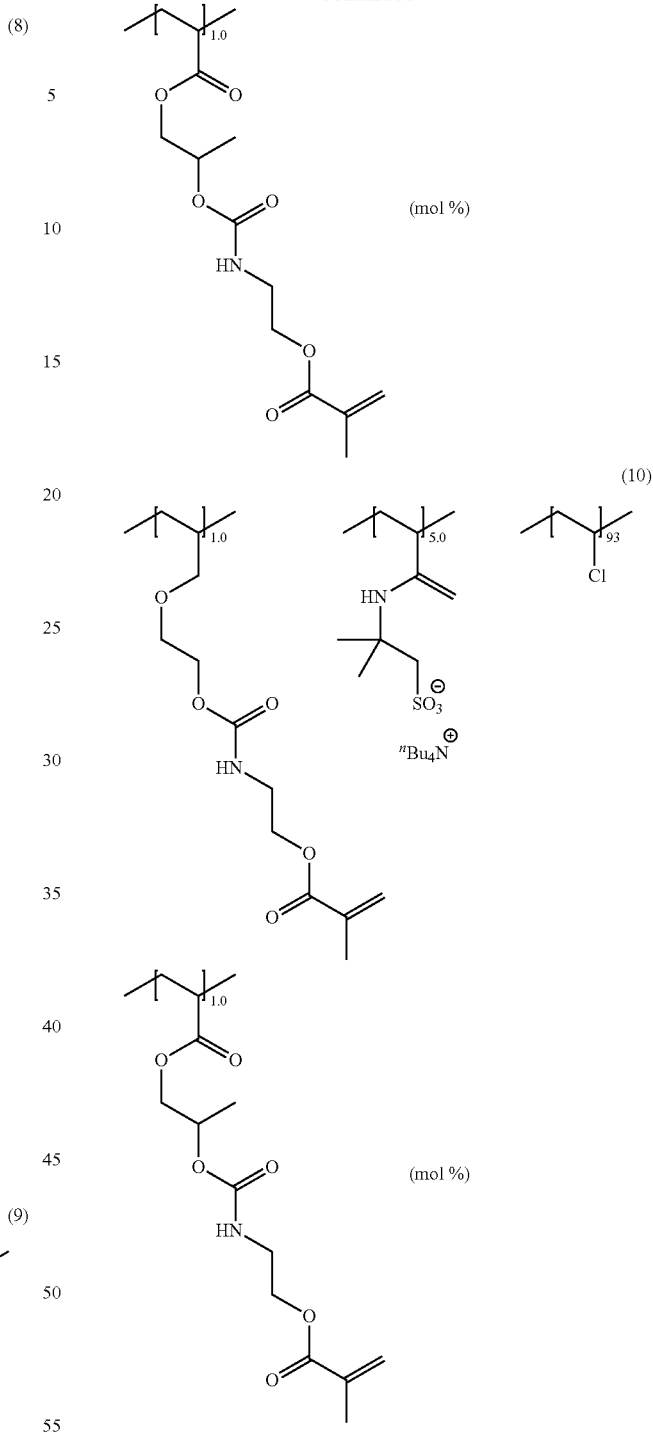

(9)

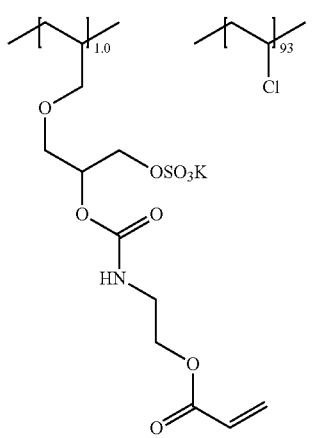

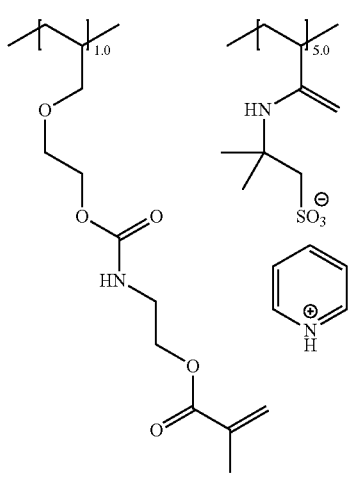

When employing Polyurethane resin A in combination with Copolymer B, the mixing ratio of the two is desirably 50 to 80 weight parts of polyurethane resin A per 100 weight parts of Copolymer B to form a nonmagnetic layer that is both highly curable and suitably flexible.

Equation (I)

The nonmagnetic layer of the magnetic tape of the present invention is a radiation-cured layer that is obtained by radiation curing a radiation-curable composition comprising a nonmagnetic powder in addition to a binder component in the form of Polyurethane resin A and, optionally, Copolymer B.

In the radiation-curable composition, the relation between the nonmagnetic powder and the binder component satisfies equation (I): 480≤(BET specific surface area of nonmagnetic powder ($m^2$/g)×weight of nonmagnetic powder (g))/weight of binder component (g)≤650. As indicated in Examples described further below, equation (I) can also be denoted as 480≤(BET specific surface area of nonmagnetic powder ($m^2$/g)×weight (weight parts) of nonmagnetic powder (g))/weight (weight parts) of binder component (g)≤650 using "weight parts" by indicating the proportions of the various components in the radiation-curable composition based on weight. In the present invention, the "BET specific surface area" means the specific surface area as measured by the BET method. In addition to resin components incorporating radiation-curable functional groups such as above-described Polyurethane resin A and Copolymer B, the binder component can include other resin compounds as well as optional components capable of polymerizing or crosslinking with them, such as optionally added crosslinking agents and radiation-curable compounds (monomers).

When the value calculated using equation (I) is less than 480, it becomes difficult to obtain a magnetic tape with good electromagnetic characteristics. This is because it becomes difficult to increase the surface smoothness of the magnetic layer as a result of a drop in the calendering processability of a magnetic tape containing a thin nonmagnetic layer due to low void ratio in the nonmagnetic layer. Additionally, when the value calculated using equation (I) exceeds 650, despite good calendering processability, the quantity of the binder component becomes excessively small relative to the nonmagnetic powder, resulting in a drop of dispersion of the nonmagnetic layer and roughening of the surface of the nonmagnetic layer. Accordingly, a decrease in the surface smoothness of the magnetic layer that is formed over it makes it difficult to obtain a magnetic tape with good electromagnetic characteristics. The value that is calculated using equation (I) is desirably equal to or higher than 490 and equal to or lower than 640 to further enhance the electromagnetic characteristics.

Carbon black and a nonmagnetic powder other than carbon black are normally employed in combination in the nonmagnetic layer of a magnetic tape. Accordingly, the nonmagnetic layer of the magnetic tape of the present invention can also contain carbon black and nonmagnetic powders other than carbon black. When two or more different nonmagnetic powders are incorporated in this manner, for example, when nonmagnetic powder 1 and nonmagnetic powder 2 (for example, carbon black) are incorporated into the nonmagnetic layer, equation (I) becomes:

480≤(BET specific surface area of nonmagnetic powder 1 ($m^2$/g)×weight of nonmagnetic powder 1 (g)+BET specific surface area of nonmagnetic powder 2 ($m^2$/g)×weight of nonmagnetic powder 2 (g))/weight of binder component (g)≤650.

The nonmagnetic powder other than carbon black can be an organic or inorganic substance. Examples of inorganic substances are metals, metal oxides, metal carbonates, metal sulfates, metal nitrides, metal carbides, and metal sulfides. These nonmagnetic powders are available as commercial products and can be manufactured by known methods.

The BET specific surface area of the above nonmagnetic powder is desirably 1 to 100 $m^2$/g, preferably 30 to 90 $m^2$/g, and more preferably, 50 to 80 $m^2$/g. A BET specific surface area falling within the range of 1 to 100 $m^2$/g is desirable in that suitable surface smoothness can be achieved and a desired quantity of binder can be dispersed.

The oil absorption capacity using dibutyl phthalate (DBP) is desirably 5 to 100 mL/100 g, preferably 10 to 80 mL/100 g, and more preferably, 20 to 60 mL/100 g.

The specific gravity is desirably 1 to 12, preferably 3 to 6. The tap density is desirably 0.05 to 2 g/mL, preferably 0.2 to 1.5 g/mL. At a tap density falling within the range of 0.05 to 2 g/mL, few particles scatter, handling is facilitated, and there is a tendency not to solidify on the device.

Examples of the nonmagnetic powder other than carbon black include titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. They may be employed singly or in combinations of two or more. α-iron oxide and titanium oxide are preferred.

The nonmagnetic powder may be acicular, spherical, polyhedral, or plate-shaped.

The crystallite size of the nonmagnetic powder preferably ranges from 4 nm to 1 μm, more preferably from 40 to 100 nm. The crystallite size within 4 nm to 1 μm can achieve good dispersibility and suitable surface roughness.

The average particle diameter of the nonmagnetic powder preferably ranges from 5 nm to 2 μm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Reference can be made to [0123] to [0132] of Japanese Unexamined Patent Publication (KOKAI) No. 2009-96798 for the nonmagnetic powder suitable for use in the magnetic tape of the present invention.

Carbon black may be employed in the nonmagnetic layer to reduce surface resistivity, reduce light transmittance, and achieve a desired micro-Vickers hardness. To this end, furnace black for rubber, thermal black for rubber, black for coloring, acetylene black and the like may be employed.

The BET specific surface area of the carbon black employed in the nonmagnetic layer is desirably 10 to 500 $m^2$/g, preferably 50 to 300 $m^2$/g. Carbon black having a BET specific surface within the above-described range is desirably employed because good dispersibility can be achieved.

The DBP oil absorption capacity of the carbon black is desirably 20 to 400 mL/100 g, preferably 30 to 200 mL/100 g. The particle diameter of the carbon black is preferably 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. For example, the *Carbon Black Handbook* compiled by the Carbon Black Association, which is expressly incorporated herein by reference in its entirety, may be consulted for types of carbon black suitable for use in the nonmagnetic layer. These carbon blacks are commercially available.

Of the contents of nonmagnetic powder and binder components in the radiation-curable composition used to form the nonmagnetic layer, the binder component constitutes, for example, 5 to 50 weight parts, preferably 10 to 30 weight parts, per 100 weight parts of nonmagnetic powder. When employing carbon black and a nonmagnetic powder other than carbon black in combination, the individual content of the carbon black and that of the nonmagnetic powder is, for example, 10 to 90 weight parts, preferably 20 to 80 weight parts, per 100 weight parts of the combined quantity of nonmagnetic powder components. In the present invention, it is necessary to specify equation (I) not just in terms of weight, but also in terms of the specific surface area of the powder components of the nonmagnetic layer. This is because the dispersion and void ratio of the nonmagnetic layer cannot be adequately controlled by just weight.

Radiation-Curable Composition and the Nonmagnetic Layer

The radiation-curable composition comprises both the binder component and a nonmagnetic powder, and can optionally contain known solvents, polymerization initiators, additives, other polymers, and the like. Examples of solvents are those given by way of example for the reaction solvents above. Methyl ethyl ketone, cyclohexanone, and mixed solvents thereof, which are widely employed in the coating liquids of magnetic recording media, are suitable. When employing an electron beam in the curing reaction, no polymerization initiator is needed.

When manufacturing large quantities of a particulate magnetic recording medium, the coating liquid is stored for an extended period of six months or more, for example. However, vinyl chloride binders generally have poor stability. In particular, when a radiation-curable vinyl chloride resin is employed, the stability of the coating liquid sometimes drops precipitously. This has been attributed to reaction of the radiation-curable functional groups during storage, causing a change in molecular weight.

The synthesis reaction of a radiation-curable resin is normally conducted in the presence of a polymerization inhibitor to protect the radiation-curable functional groups. Accordingly, to prevent radiation-curable functional groups from reacting during extended storage, it is conceivable to increase the quantity of polymerization inhibitor. However, when the quantity of polymerization inhibitor is simply increased, the curability when irradiated with radiation decreases, making it difficult to obtain a tough coating.

By contrast, it has become clear that when radiation-curable vinyl chloride copolymers are stored in the presence of a benzoquinone compound, it is possible to maintain good long-term storage stability without losing curability. Accordingly, radiation-curable vinyl chloride copolymers such as Copolymer B that can be employed to form the nonmagnetic layer in the present invention are desirably stored in a composition containing a benzoquinone compound when being employed after an extended period of storage.

The benzoquinone compound is a compound comprising a benzoquinone skeleton. The benzoquinone skeleton contained therein can be the o-benzoquinone skeleton or p-benzoquinone skeleton indicated below.

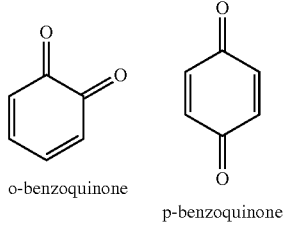 [SMILES: O=C1C=CC=CC1=O ; O=C1C=CC(=O)C=C1]

o-benzoquinone p-benzoquinone

From the perspective of availability, the benzoquinone skeleton is desirably a compound comprising a p-benzoquinone skeleton. The benzoquinone skeleton in the benzoquinone compound may be substituted or unsubstituted. Examples of substituents (which may themselves be substituted) are alkyl groups, alkoxyl groups, hydroxyl groups, halogen atoms, aryl groups, cyano groups, nitro groups, and any of the substituents contained in Example compounds indicated below. Further, the benzoquinone compound employed may have one, two, or more benzoquinone skeletons. Example compounds given below are examples of desirable benzoquinone compounds.

From the perspective of availability, the benzoquinone skeleton is desirably a compound comprising a p-benzoquinone skeleton. The benzoquinone skeleton in the benzoquinone compound may be substituted or unsubstituted. Examples of substituents (which may themselves be substituted) are alkyl groups, alkoxyl groups, hydroxyl groups, halogen atoms, aryl groups, cyano groups, nitro groups, and any of the substituents contained in Example compounds indicated below. Further, the benzoquinone compound employed may have one, two, or more benzoquinone skeletons. Example compounds given below are examples of desirable benzoquinone compounds.

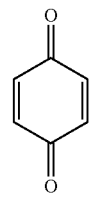

(1)

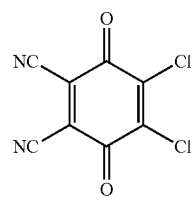

(2)

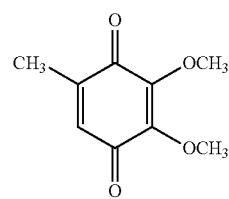

(3)

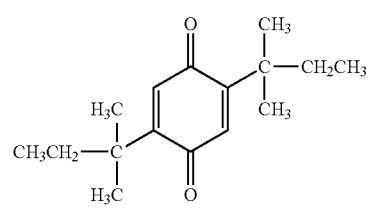

(4)

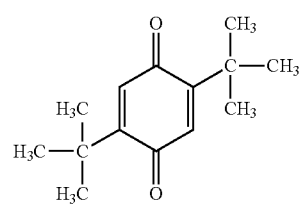

(5)

(6) 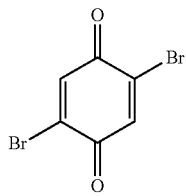
(7) 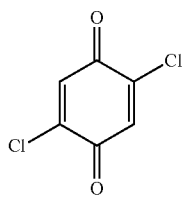
(8) 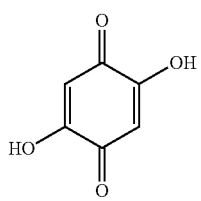
(9) 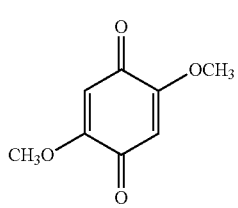
(10) 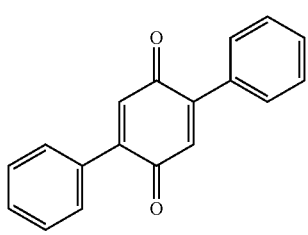
(11) 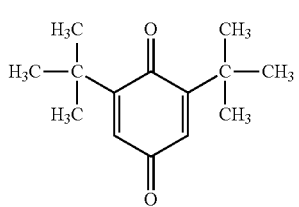
(12) 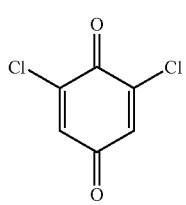
(13) 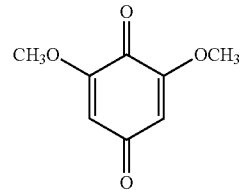
(14) 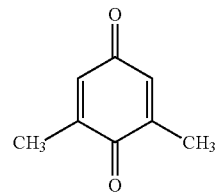
(15) 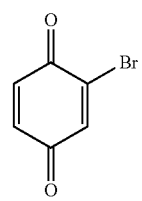
(16) 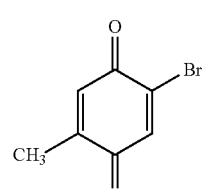
(17) 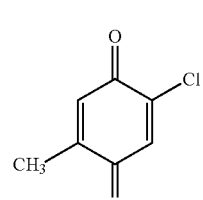
(18) 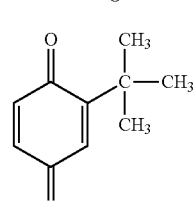
(19) 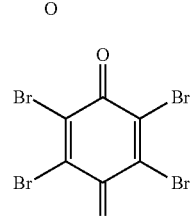
(20) 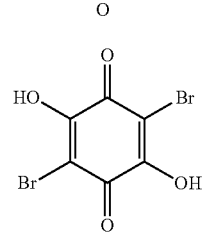

(21) 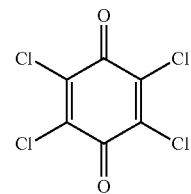

(22) 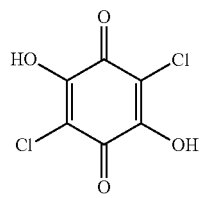

(23) 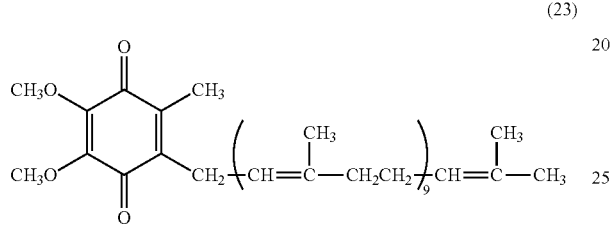

(24) 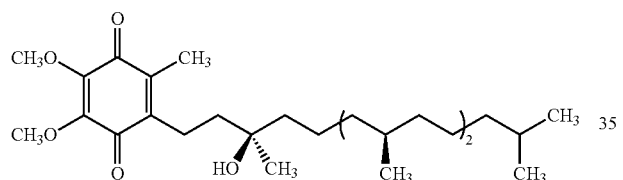

(25) 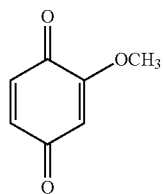

(26) 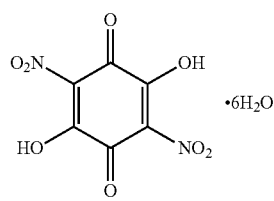

(27) 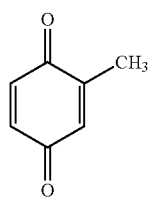

(28) 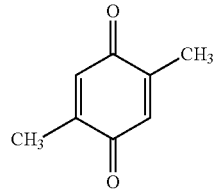

(29) 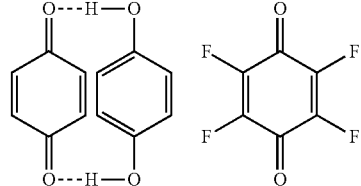

(30) 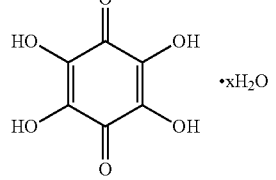

(31) 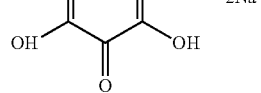

(32) 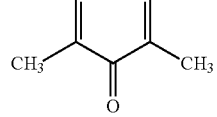

(33) 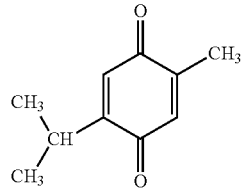

Of the above Example Compounds, Example Compounds (1) to (22) and (25) to (33) are desirable; (1) to (22), (25) to (28), (30), (32), and (33) are preferred; and compounds (1) to (22), (25) to (28), (30), and (32) are of greater preference.

Copolymer B is desirably stored in the composition containing one or more benzoquinone compounds. In that case, from the perspective of achieving both stability and curability, the content of the benzoquinone compound (the combined quantities of multiple benzoquinone compounds when multiple such compounds are employed) is desirably equal to or higher than 1 ppm but equal to or lower than 500,000 ppm, preferably equal to or higher than 1 ppm but equal to or lower than 400,000 ppm, and more preferably, equal to or higher than 100 ppm but equal to or lower than 100,000 ppm, based on Copolymer B (solid component). Polyurethane resin A, that is a radiation-curable polyurethane resin, can also be employed with a benzoquinone compound. In that case, the quantity of the benzoquinone compound employed is desirably equal to or higher than 1 ppm but equal to or lower than 500,000 ppm, preferably equal to or higher than 1 ppm but equal to or lower than 400,000 ppm, and more preferably equal to or higher than 1 ppm but equal to or lower than 300,000 ppm, still further preferably, equal to or higher than 1 ppm but equal to or lower than 500 ppm, based on the solid component of Polyurethane resin A.

Benzoquinone compounds can be added simultaneously or sequentially to the radiation-curable composition, or to the composition comprising the starting materials of Copolymer B or Polyurethane resin A. Benzoquinone compounds are desirably present in a system containing radiation-curable functional group-containing components, such as the synthesis reaction of Copolymer B or Polyurethane A, the reaction for incorporation of radiation-curable functional groups, and the like. The components that are added during the reaction are thought to perform the role of inhibiting the radiation-curable functional groups from reacting during the reaction and of enhancing storage stability without loss of curability when irradiated with radiation.

The various compounds described above can be synthesized by known methods or the above-described methods. Some of them are available as commercial products.

The solid component concentration of the radiation-curable composition employed for forming the nonmagnetic layer of the magnetic tape of the present invention is not specifically limited. From the perspective of ease of handling, it is preferably about 10 to 80 weight percent, more preferably, about 20 to 60 weight percent.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Details of the binder resin in the nonmagnetic layer are as set forth above. Lubricants, dispersing agents and other additives, solvents, dispersion methods, and the like suited to the magnetic layer may be adopted to the nonmagnetic layer. In particular, known techniques for the quantity and type of additives employed in the magnetic layer may be adopted thereto.

As set forth above, raising the void ratio of the nonmagnetic layer is effective to increase calendering processability and enhance electromagnetic characteristics. However, raising the void ratio means a decrease in the binder component, which in turn means decreased dispersion. Accordingly, from the perspective of increasing the void ratio within a range that permits maintaining good dispersion, the void ratio of the nonmagnetic layer desirably falls within a range of 25 to 38 volume percent. In the present invention, the radiation-curable composition used to form the nonmagnetic layer satisfies equation (I), making it possible to obtain a nonmagnetic layer containing a void ratio of the desired level indicated above. In this context, the void ratio can be obtained by sectional observation by a scanning electron microscope (SEM), or by the method indicated in Examples further below. The method indicated in Examples gives the void ratio of the nonmagnetic layer and magnetic layer combined. Since the fill rate of the magnetic layer in a high-density recording magnetic tape is extremely high, the void ratio that is obtained can be viewed as being the void ratio of the nonmagnetic layer. In conventional magnetic tapes having relatively thick nonmagnetic layers, the coefficient of friction rises and running properties tend to deteriorate when the fill rate of the magnetic layer is increased. This is presumed to be because a thick nonmagnetic layer has a large quantity of accumulated lubricant, causing a large amount of lubricant component to seep out. By contrast, the nonmagnetic layer is thin (0.5 to 1.3 μm in thickness) in the magnetic tape of the present invention. Thus, an increase in the coefficient of friction can be prevented and running properties can be well maintained despite a high void ratio. Examples of lubricant components that can be added to the nonmagnetic layer are fatty acids and/or derivatives thereof (such as fatty acid esters). Specific examples thereof are described in paragraph [0111] in Japanese Unexamined Patent Publication (KOKAI) No. 2009-96798. The quantity of lubricant component that is added is, for example, 0.01 to 10 weight parts, desirably 0.05 to 6 weight parts, and preferably, 0.1 to 3 weight parts per 100 weight parts of nonmagnetic powder.

The radiation-curable composition can be prepared by mixing the various components set forth above. An electron beam or ultraviolet radiation, for example, can be employed as the radiation employed for irradiation in the curing reaction. The use of an electron beam is desirable because no polymerization initiator is required. The irradiation with radiation can be conducted by a known method. For example, reference can be made to paragraphs [0021] to [0023] in Japanese Unexamined Patent Publication (KOKAI) No. 2009-134838, which is expressly incorporated herein by reference in its entirety, and the like for details. Known radiation curing devices and methods of curing by irradiation with radiation can be employed, such as those described in "UV and EB curing techniques" (published by the Sogo Gijutsu Center (Ltd.)) and "Applied techniques of low-energy electron beam irradiation" (2000, published by CMC (Ltd.)), which are expressly incorporated herein by reference in their entirety. The thickness of the nonmagnetic layer that is formed is 0.5 to 1.3 μm. That is because at less than 0.5 μm, the nonmagnetic layer is thin and it is difficult to improve calendering processability and enhance electromagnetic characteristics despite satisfying equation (I) and increasing the void ratio. When 1.3 μm is exceeded, seepage of lubricant component out of the nonmagnetic layer with its increased void ratio becomes excessive, the coefficient of friction rises, and the running property deteriorates. The thickness of the nonmagnetic layer desirably falls within a range of 0.6 to 1.3 μm from the perspective of achieving both electromagnetic characteristics and running properties.

Magnetic Layer (i) Ferromagnetic Powder

The magnetic recording medium of the present invention comprises a magnetic layer containing a ferromagnetic powder and a binder on the nonmagnetic layer (radiation-cured layer) that has been formed by curing with radiation the above radiation-curable composition. Acicular ferromagnetic powder, platelike magnetic powder, spherical magnetic powder, or elliptical magnetic powder can be employed as the ferromagnetic powder. From the perspective of high-density recording, the BET specific surface area of the acicular ferromagnetic powder is desirably equal to or greater than 40 $m^2/g$ but equal to or lower than 80 $m^2/g$ and preferably equal to or greater than 50 $m^2/g$ nm but equal to or lower than 70 $m^2/g$. The BET specific surface area of the platelike magnetic powder is preferably equal to or greater than 10 $m^2/g$ but equal to or less than 200 $m^2/g$. The BET specific surface area of the spherical magnetic powder or elliptical magnetic powder is desirably equal to or greater than 30 $m^2/g$ but equal to or lower than 100 $m^2/g$ and preferably equal to or greater than 50 $m^2/g$ nm but equal to or lower than 70 $m^2/g$. The average major axis length of the acicular ferromagnetic powder is desirably equal to or greater than 20 nm but equal to or lower than 50 nm and preferably equal to or greater than 20 nm but equal to or lower than 45 nm. The average plate diameter of the platelike magnetic powder is preferably equal to or greater than 10 nm but equal to or less than 50 nm as a hexagonal plate diameter. When employing a magnetoresistive head in reproduction, a plate diameter equal to or less than 40 nm is desirable to reduce noise. A plate diameter within the above range can yield stable magnetization without the effects of thermal fluctuation, and permit low noise, that is suited to the high-density magnetic recording. From the perspective of high-density recording, the average diameter of the spherical magnetic powder or elliptical magnetic powder is desirably equal to or greater than 10 nm but equal to or lower than 50 nm.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Reference can be made to [0097] to [0110] of Japanese Unexamined Patent Publication (KOKAI) No. 2009-96798 for the details of the above-described magnetic powders.

(ii) Additives

Additives may be added to the magnetic layer as needed. Examples of such additives are: abrasives, lubricants, dispersing agents, dispersing adjuvants, antifungal agents, antistatic agents, oxidation inhibitors, and solvents. Reference can be made to [0111] to [0115] of Japanese Unexamined Patent Publication (KOKAI) No. 2009-96798 for the details, such as specific examples, of the additives.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 100 to 500 $m^2/g$ (more preferably 150 to 400 $m^2/g$), the DBP oil absorption capacity is 20 to 400 ml/100 g (more preferably 30 to 200 ml/100 g), the particle diameter is 5 to 100 nm (more preferably 10 to 90 nm, and further preferably, 10 to 80 nm), the pH is 2 to 10, the moisture content is 0.1 to 10 percent, and the tap density is 0.1 to 1 g/ml. For example, the *Carbon Black Handbook* compiled by the Carbon Black Association, which is expressly incorporated herein by reference in its entirety, may be consulted for types of carbon black suitable for use in the magnetic layer. These carbon blacks are commercially available.

From the perspective of increasing the surface-smoothing effect of calendering on the magnetic layer, the average particle diameter of the carbon black contained in the magnetic layer is desirably 10 to 200 nm, preferably 50 to 150 nm, and more preferably, 70 to 120 nm. From a similar perspective, the quantity of carbon black in the magnetic layer is desirably 0.1 to 5 weight parts, preferably 0.2 to 2 weight parts per 100 weight parts of ferromagnetic powder. From a similar perspective, the average particle diameter of the abrasive in the magnetic layer is desirably 10 to 150 nm, preferably 30 to 150 nm, and more preferably, 50 to 120 nm. The quantity of abrasive in the magnetic layer is desirably 1 to 20 weight parts, preferably 3 to 15 weight parts, per 100 weight parts of ferromagnetic powder. Primarily known materials with a Mohs' hardness of equal to or higher than 6, such as α-alumina with an α-conversion rate of equal to or higher than 90 percent, β-alumina, silicon carbide, chromium oxide, cerium oxide, α-iron oxide, corundum, artificial diamond, silicon nitride, silicon carbide, titanium carbide, titanium oxide, silicon dioxide, and boron nitride, can be employed singly or in combination.

The type and weight of the additives that are employed in the present invention can be separately determined as needed for the magnetic layer and the nonmagnetic layer. All or some portion of the additives employed in the present invention can be added during any step during the manufacturing of the magnetic layer and nonmagnetic layer coating liquids. For example, there will be cases where they are admixed to the ferromagnetic powder prior to the kneading step; cases where they are added during the step of kneading the ferromagnetic powder, binder, and solvent; cases where they are added during the dispersing step; cases where they are added after dispersion; and cases where they are added immediately prior to coating.

Conventionally known thermoplastic resins, thermosetting resins, reactive resins, and mixtures thereof can be employed as binders to form the magnetic layer. Reference can be made to paragraphs [0014] to [0020] of Japanese Unexamined Patent Publication (KOKAI) No. 2005-222644, which is expressly incorporated herein by reference in its entirety, for details, for example. It is also possible to employ Polyurethane resin A and/or Copolymer B to form a magnetic layer in the form of a radiation-cured layer. From the perspective of achieving both a high ferromagnetic powder fill rate and magnetic layer strength, the quantity of binder in the magnetic layer is desirably equal to or more than 5 weight parts and equal to or less than 30 weight parts, preferably equal to or more than 10 weight parts and equal to or less than 20 weight parts per 100 weight parts of ferromagnetic powder.

From the perspective of achieving high-density recording, the thickness of the magnetic layer is also desirably reduced. From this perspective, the thickness of the magnetic layer is desirably equal to or less than 0.10 µm, preferably equal to or less than 0.08 µm. From the perspective of forming a uniform magnetic layer, the thickness of the magnetic layer is desirably equal to or more than 0.01 µm, preferably equal to or more than 0.02 µm, and more preferably, equal to or more than 0.03 µm. The magnetic layer is comprised of at least one layer, but can be comprised of two or more separate layers having different magnetic characteristics. A known multilayered magnetic layer structure can be applied.

Nonmagnetic Support

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The surface roughness of the nonmagnetic support employed in the present invention preferably ranges from 1 to 10 nm, as a center line average roughness measured by the method described in Examples further below.

Backcoat Layer

Generally, a magnetic tape used for computer data recording will be required to have better repeat running properties than a video tape or an audio tape. To maintain such a high degree of storage stability, a backcoat layer can be provided on the opposite surface of the nonmagnetic support from the surface on which the magnetic layer is provided. The backcoat layer coating liquid can be formed by dispersing particulate components such as an abrasive, an antistatic agent, and the like and binder in an organic solvent. Various inorganic pigments, carbon black, and the like can be employed as the particulate components. Resins such as nitrocellulose, phenoxy resin, vinyl chloride resin, and polyurethane can be employed singly or in combination as the binder.

The magnetic tape of the present invention may have a smoothing layer, adhesive layer, and the like, in addition to the magnetic layer, nonmagnetic layer, and backcoat layer optionally formed. Known techniques regarding these layers can be applied.

Layer Structure

In the magnetic tape of the present invention, the thickness of the nonmagnetic support desirably ranges from 3 to 80 µm. When the above smoothing layer is provided between the nonmagnetic support and the nonmagnetic layer or the magnetic layer, the thickness of the smoothing later desirably ranges from 0.01 to 0.8 µm, and preferably 0.02 to 0.6 µm. The thickness of the above backcoat layer is, for example, 0.1 to 1.0 µm, and desirably 0.2 to 0.8 µm. Details of the thickness of the magnetic layer and the nonmagnetic layer are as set forth above. The nonmagnetic layer is effective so long as it is substantially nonmagnetic. For example, it exhibits the effect of the present invention even when it comprises impurities or trace amounts of magnetic materials that have been intentionally incorporated, and can be viewed as substantially having the same configuration as the magnetic tape of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

Manufacturing Method

The steps for manufacturing coating liquids for forming the various layers such as the magnetic layer, the nonmagnetic layer, and the backcoat layer desirably include at least a kneading step, dispersing step, and mixing steps provided as needed before and after these steps. Each of these steps may be divided into two or more stages. All of the starting materials such as the ferromagnetic powder, nonmagnetic powder, binder, carbon black, abrasives, antistatic agents, lubricants, solvents and the like that are employed in the present invention can be added at the beginning or part way through any of the steps. Individual starting materials can be divided into smaller quantities and added in two or more increments. To prepare coating liquids for forming the various layers, conventionally known manufacturing techniques may be utilized for some of the steps. A kneader having a strong kneading force, such as an open kneader, continuous kneader, pressure kneader, or extruder is preferably employed in the kneading step. When a kneader is employed, the binder (preferably equal to or higher than 30 weight percent of the entire quantity of binder) can be kneaded in a range of 15 to 500 parts per 100 parts of the ferromagnetic powder or nonmagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for various layers. Other than glass beads, dispersing media with a high specific gravity such as zirconia beads, titania beads, and steel beads are suitable for use. The particle diameter and fill ratio of these dispersing media can be optimized for use. A known dispersing device may be employed.

The magnetic tape of the present invention can be manufactured by, for example, forming a nonmagnetic layer (radiation-cured layer) by coating and radiation curing a nonmagnetic layer coating liquid to a prescribed film thickness on the surface of a nonmagnetic support while the nonmagnetic support is running, and then forming a magnetic layer thereover by coating a magnetic layer coating liquid to a prescribed film thickness. Here, multiple magnetic layer coating liquids can be sequentially or simultaneously applied in a multilayer coating.

Generally, in the case where a lower nonmagnetic layer coating liquid and an upper magnetic layer coating liquid are sequentially applied in a multilayer coating, a portion of the nonmagnetic layer sometimes dissolves in the solvent contained in the magnetic layer coating. When the nonmagnetic layer is formed from a highly-curable radiation-curable composition as a radiation-cured layer, irradiation with radiation causes the binder component in the nonmagnetic layer to polymerize or crosslink, increasing the molecular weight.

Thus, dissolution in the solvent contained in the magnetic layer coating liquid can be prevented or reduced. Further, the high curability of the nonmagnetic layer and the fact that mixing at the interface with the magnetic layer can be prevented are advantageous in that they can inhibit a drop in the surface smoothness and the coating strength of the magnetic layer due to the tendency of magnetic layer components to penetrate into the nonmagnetic layer. From this perspective, it is advantageous to employ a nonmagnetic layer in the form of a radiation-cured layer. When doing so, the use of Copolymer B that is highly curable is effective.

The coating machine used to apply the magnetic layer coating liquid or nonmagnetic layer coating liquid can be an air doctor coater, blade coater, rod coater, extrusion coater, air knife coater, squeeze coater, dip coater, reverse roll coater, transfer roll coater, gravure coater, kiss coater, cast coater, spray coater, spin coater or the like. Reference can be made to the "Most Recent Coating Techniques" (May 31, 1983) released by the Sogo Gijutsu Center (Ltd.), which are expressly incorporated herein by reference in their entirety, for these coating machines. In the course of forming a radiation-cured layer, the coating layer that has been formed by applying the coating liquid is cured by irradiation with radiation. The details of processing by irradiation with radiation are as set forth above. After the coating step, the medium can be subjected various types of post-processing such as orienting and the surface smoothing (calendering) of the magnetic layer, and thermoprocessing to reduce thermal contraction. Reference can be made to paragraphs [0146] to [0148] of Japanese Unexamined Patent Publication (KOKAI) No. 2009-96798 for the details of this processing. Subsequently, the stock material of magnetic recording medium can be cut to desired size with a cutter or the like to obtain a magnetic tape.

In Japanese Unexamined Patent Publication (KOKAI) No. 2002-42327, two cycles of calendering are conducted, one after coating the nonmagnetic layer coating liquid and one after forming the magnetic layer. However, calendering the nonmagnetic layer before forming the magnetic layer in this manner is undesirable from the perspective of productivity. By contrast, the present invention can enhance the effectiveness of calendering by having the radiation-curable composition that is employed to form the nonmagnetic layer satisfy equation (I), thereby making it possible to obtain a magnetic tape with good electromagnetic characteristics by conducting calendering after forming the magnetic layer without subjecting the nonmagnetic layer to calendering before forming the magnetic layer. The amount of change (drop) ΔRa in the center plane average surface roughness Ra due to calendering of the magnetic layer as measured by an atomic force microscope can be employed as an index of the effectiveness of calendering conducted in this manner. The present invention is capable of achieving a calendering processing property ΔRa of 6.00 to 7.50 nm. As described in above-cited Japanese Unexamined Patent Publication (KOKAI) No. 2009-96798, the calendering conditions can be a calender roll temperature falling within a range of 60 to 100° C., desirably within a range of 70 to 100° C., and preferably within a range of 80 to 100° C.; and a pressure falling within a range of 100 to 500 kg/cm, preferably falling within a range of 200 to 450 kg/cm, and more preferably, falling within a range of 300 to 400 kg/cm.

The magnetic tape of the present invention as set forth above can achieve both a thin nonmagnetic layer and enhanced electromagnetic characteristics, and is suitable as a high-capacity data backup tape. In a magnetic tape having a thin nonmagnetic layer based on the present invention, it is possible to achieve a magnetic layer in which the center plane average surface roughness Ra as measured by an atomic force microscope falls within a range of 1.00 to 3.30 nm and which is of high surface smoothness. The conditions for measuring the center plane average surface roughness Ra of the magnetic layer by an atomic surface microscope (AFM) in the present invention are as follows:

Device: Nanoscope III made by Veeco Instruments Inc.
Mode: AFM mode (contact mode)
Measurement range: 40 micrometer square
Scan lines: 512*512
Scan speed: 2 Hz
Scan direction: Longitudinal direction of medium The present invention further relates to a method of manufacturing the magnetic tape of the present invention. In the method of manufacturing the magnetic tape of the present invention, the above-described radiation-curable composition is coated and radiation cured, a magnetic layer is formed on the radiation-cured layer that has been formed, and calendering is conducted. However, the nonmagnetic layer is not calendered prior to forming the magnetic layer. This can enhance productivity. The efficiency of calendering that is achieved desirably falls within a range of 6.00 to 7.50 nm as the change ΔRa in the center plane average surface roughness Ra as measured by an atomic force microscope.

EXAMPLES

The present invention will be described in detail below based on Examples. However, the present invention is not limited to the examples. The "parts" and "percent" given in Examples are weight parts and weight percent unless specifically stated otherwise. The $^1$H-NMR measurement described below was conducted with a 400 MHz NMR (AvanceII-400 made by Bruker).

1. Preparation Examples and Evaluation of Radiation-Curable Vinyl Chloride Copolymer Preparation Example 1-1

(1) Polymerization of Vinyl Chloride Copolymer

Vinyl chloride: 100 parts,
Allyl glycidyl ether: 11.9 parts,
2-Hydroxypropyl methacrylate: 4.1 parts,
Allyl-2-hydroxyethyl ether: 3.6 parts
Sodium lauryl sulfate: 0.8 part, and
Water: 117 parts
were charged and stirred at 50° C.
  Subsequently,
Potassium persulfate: 0.6 part
was charged and emulsification polymerization was begun. Following reaction for 10 hours, cooling was conducted when the pressure in the polymerization apparatus had reached 2 kg/cm$^2$. The unreacted vinyl chloride was recovered, after which the product was drained, washed, and dried, yielding a vinyl chloride copolymer (1) with a copolymer ratio (mol percent) of:
Vinyl chloride: 93.0 mol percent,
Allyl glycidyl ether: 4.0 mol percent,
2-Hydroxypropyl methacrylate: 1.0 mol percent,
Allyl-2-hydroxyethyl ether: 1.0 mol percent,
Units in which the ring of the epoxy group in the allyl glycidyl ether had been opened with sulfuric acid: 1.0 mol percent.

(2) Reaction Introducing a Radiation-Curable Functional Group

To a two-liter flask was added 416 g of a 30 percent cyclohexanone solution of vinyl chloride copolymer (1) (solid component 124.8 g) and the solution was stirred at 210 rpm. Next, 0.28 g of 1,4-benzoquinone (2.60 mol, 20,000 ppm) was added, stirred, and dissolved.

Next, 0.125 g of dibutyltin dilaurate was added as a reaction catalyst and the mixture was stirred while raising the temperature to 40 to 50° C. Next, 13.75 g (0.09 mol) of 2-methacryloyloxyethyl isocyanate (MOI made by Showa Denko K.K.) was added dropwise over 30 minutes as a radiation-curable functional group-incorporating component. When the dropwise addition had been completed, the mixture was stirred for 2 hours at 40° C. and cooled to room temperature, yielding a resin solution (radiation-curable composition) comprising a radiation-curable functional group (methacryloyloxy group)-containing vinyl chloride copolymer (Specific Example Compound (1)).

$^1$H-NMR data and assignments are given below for the radiation-curable function group (methacryloyloxy group)-containing vinyl chloride copolymer.

Radiation-curable function group (methacryloyloxy group)-containing vinyl chloride copolymer (Specific Example Compound (1)): $^1$H-NMR (DMSO-$d_6$) δ(ppm)=6.2-6.0 (C=C double bond peak), 5.8-5.6 (C=C double bond peak), 4.6-4.2 (br., m), 4.2-4.0 (m), 3.9-3.1 (m), 3.1-3.0 (br., s), 2.7-2.65 (br., s), 2.60-2.0 (m), 2.0-0.7 (br., m).

The solid component of the resin solution obtained by the above steps constituted 31.0 percent. Within one day of preparing the resin solution, the weight average molecular weight (Mw) and number average molecular weight (Mn) of the radiation-curable group-containing vinyl chloride copolymer contained in the solution were obtained by the methods set forth further below as Mw=51,000 and Mn=29,000. The glass transition temperature (Tg), sulfate group concentration, and methacryloyloxy group concentration of the radiation-curable functional group-containing vinyl chloride copolymer (Specific Example Compound (1)) were measured by the methods set forth further below as Tg=64° C., sulfate group concentration=70 mmol/kg, and methacryloyloxy group concentration=360 mmol/kg.

Preparation Example 1-2

With the exception that 2-(2-isocyanate ethyloxy)ethyl methacrylate (Karenz_MOI-EG made by Showa Denko K.K.) was employed instead of 2-methacryloyloxyethyl isocyanate in the radiation-curable group-introducing reaction of Preparation Example 1-1, a resin solution containing a radiation-curable functional group-containing vinyl chloride copolymer (Specific Example Compound (2)) was obtained by the same method as in Preparation Example 1-1. $^1$H-NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (br., m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-3

With the exception that 2-acryloyloxyethyl isocyanate (Karenz_AOI made by Showa Denko K.K.) was employed instead of 2-methacryloyloxyethyl isocyanate in the radiation-curable group-introducing reaction of Preparation Example 1-1, a resin solution containing a radiation-curable functional group-containing vinyl chloride copolymer (Specific Example Compound (3)) was obtained by the same method as in Preparation Example 1-1. $^1$H-NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-4

With the exception that 1,1-bis(acryloyloxymethyl)ethyl isocyanate (Karenz_BEI made by Showa Denko K.K.) was employed instead of 2-methacryloyloxyethyl isocyanate in the radiation-curable group-introducing reaction of Preparation Example 1-1, a resin solution containing a radiation-curable functional group-containing vinyl chloride copolymer (Specific Example Compound (4)) was obtained by the same method as in Preparation Example 1-1. H$^1$-NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-5

With the exception that 2-hydroxypropyl acrylate was employed instead of 2-hydroxypropyl methacrylate in the polymerization of the vinyl chloride copolymer of Preparation Example 1-1, a resin solution containing a radiation-curable functional group-containing vinyl chloride copolymer (Specific Example Compound (5)) was obtained by the same method as in Preparation Example 1-1. $^1$H NMR data and assignments are given below for the radiation-curable function group-containing vinyl chloride copolymer obtained.

$^1$H-NMR (DMSO-$d_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-6

With the exception that 2-hydroxyethyl methacrylate was employed instead of 2-hydroxypropyl methacrylate in the polymerization of the vinyl chloride copolymer of Preparation Example 1-1, a resin solution containing a radiation-curable functional group-containing vinyl chloride copolymer (Specific Example Compound (6)) was obtained by the same method as in Preparation Example 1-1. H$^1$ NMR data and assignments are given below for the radiation-curable function group-containing vinyl chloride copolymer obtained.

$^1$H-NMR (DMSO-d$_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-7

With the exception that no 2-hydroxypropyl methacrylate was employed in the polymerization of the vinyl chloride copolymer of Preparation Example 1-1, a resin solution containing a radiation-curable functional group-containing vinyl chloride copolymer (Specific Example Compound (7)) was obtained by the same method as in Preparation Example 1-1. $^1$H NMR data and assignments are given below for the radiation-curable function group-containing vinyl chloride copolymer obtained.

$^1$H-NMR (DMSO-d$_6$) δ(ppm)=6.2-6.0 (C=C double bond peak), 5.8-5.6 (C=C double bond peak), 4.6-4.2 (br., m), 4.2-4.0 (m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-8

With the exceptions that no 2-hydroxypropyl methacrylate was employed in the polymerization of the vinyl chloride copolymer of Preparation Example 1-1, and that 2-acryloyloxyethyl isocyanate (Karenz_AOI made by Showa Denko) was employed instead of 2-methacryloyloxyethyl isocyanate in the reaction to introduce a radiation-curable functional group, a resin solution containing a radiation-curable functional group-containing vinyl chloride copolymer (Specific Example Compound (8)) was obtained by the same method as in Preparation Example 1-1. $^1$H NMR data and assignments are given below for the radiation-curable function group-containing vinyl chloride copolymer obtained.

$^1$H-NMR (DMSO-d$_6$) δ(ppm)=6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg, sulfate group concentration, and radiation-curable functional group concentration conducted in the same manner as in Preparation Example 1-1 yielded the results indicated in Table 1.

Preparation Example 1-9

With the exception that a pyridine salt of 2-acrylamide-2-methylpropane sulfonic acid was employed instead of allyl glycidyl ether in the polymerization of the vinyl chloride copolymer of Preparation Example 1-1, a resin solution containing a radiation-curable functional group-containing vinyl chloride copolymer (Specific Example Compound (9)) was obtained by the same method as in Preparation Example 1-1. $^1$H NMR data and assignments are given below for the radiation-curable function group-containing vinyl chloride copolymer obtained.

$^1$H-NMR (DMSO-d$_6$) δ(ppm)=9.0-7.0 (br., m), 6.2-6.0 (C=C double bond peak), 5.8-5.6 (C=C double bond peak), 4.6-4.2 (br., m), 4.2-4.0 (br., m), 3.9-3.1 (m), 3.1-3.0 (br., s), 3.0-2.85 (br., m), 2.7-2.65 (br., s), 2.60-2.0 (m), 2.0-0.7 (br., m).

Measurement of the average molecular weight, Tg, sulfonate group concentration, and radiation-curable functional group concentration conducted in the same manner as in Preparation Example 1-1 yielded the results indicated in Table 1.

Preparation Example 1-10

With the exception that 2-acrylamide-2-methylpropane sulfonic acid tetrabutyl ammonium salt was employed instead of allyl glycidyl ether in the polymerization of the vinyl chloride copolymer of Preparation Example 1-1, a resin solution containing a radiation-curable functional group-containing vinyl chloride copolymer (Specific Example Compound (10)) was obtained by the same method as in Preparation Example 1-1. $^1$H NMR data and assignments are given below for the radiation-curable function group-containing vinyl chloride copolymer obtained.

$^1$H-NMR (DMSO-d$_6$) δ(ppm)=6.2-6.0 (C=C double bond peak), 5.8-5.6 (C=C double bond peak), 4.6-4.2 (br., m), 4.2-4.0 (br., m), 3.9-3.1 (br., m), 3.1-3.0 (br., s), 3.0-2.85 (br., m), 2.7-2.65 (br., s), 2.60-2.0 (m), 2.0-0.7 (br., m).

Measurement of the average molecular weight, Tg, sulfonate group concentration, and radiation-curable functional group concentration conducted in the same manner as in Preparation Example 1-1 yielded the results indicated in Table 1.

Preparation Example 1-11

With the exception that no 1,4-benzoquinone was added in the polymerization of the vinyl chloride copolymer of Preparation Example 1-1, a resin solution containing a radiation-curable functional group-containing vinyl chloride copolymer (Specific Example Compound (1)) was obtained by the same method as in Preparation Example 1-1. The average molecular weight, Tg, sulfate group concentration, and radiation-curable functional group concentration were measured in the same manner as in Preparation Example 1-1, and measurement values identical to those in Preparation Example 1-1 were obtained.

Comparative Preparation Example 1-1

Synthesis of the Radiation-Curable Vinyl Chloride Copolymer Described in Japanese Unexamined Patent Publication (KOKAI) No. 2004-352804

In accordance with the method described in paragraphs [0040] and [0041] in Japanese Unexamined Patent Publication (KOKAI) No. 2004-352804, the resin of Preparation Example 1 (a radiation-curable vinyl chloride copolymer) in Japanese Unexamined Patent Publication (KOKAI) No. 2004-352804 was obtained. Measurement of the radiation-curable functional group concentration conducted in the same manner as in Preparation Example 1-1 yielded the results indicated in Table 1.

<Methods of Evaluating the Radiation-Curable Vinyl Chloride Copolymers>

(1) Measurement of the Average Molecular Weight

The average molecular weight (Mw) of the radiation-curable functional group-containing vinyl chloride copolymers contained in the various resin solutions of the preparation examples and comparative preparation example was obtained by standard polystyrene conversion by gel permeation chromatography (GPC) with DMF solvent containing 0.3 percent lithium bromide.

(2) Sulfuric Acid (Salt) Group Concentration and Sulfonic Acid (Salt) Group Concentration The quantity of elemental sulfur was quantified from the area of the elemental sulfur (S) peak by fluorescence X-ray analysis and converted to the quantity of elemental sulfur per kilogram of radiation-curable functional group-containing vinyl chloride copolymer. The sulfuric acid (salt) group or sulfonic acid (salt) group concentration of the radiation-curable functional group-containing vinyl chloride copolymer was then calculated.

(3) Measurement of the Glass Transition Temperature (Tg)

Measurement was conducted by the viscoelasticity method with a Rheovibron made by Toyo Baldwin.

(4) Content of Radiation-Curable Functional Groups in the Copolymer

This was calculated based on the NMR integration ratio.

TABLE 1

| | Weight average molecular weight Mw | Tg (°C.) | Concentration of sulfate or sulfonate group (mmol/kg) | Concentration of radiation-curable functional group (mmol/kg) |
|---|---|---|---|---|
| Preparation Example 1-1 | 51500 | 64 | 70 | 360 |
| Preparation Example 1-2 | 52000 | 64 | 70 | 360 |
| Preparation Example 1-3 | 51300 | 66 | 70 | 360 |
| Preparation Example 1-4 | 52000 | 63 | 70 | 720 |
| Preparation Example 1-5 | 53000 | 62 | 70 | 360 |
| Preparation Example 1-6 | 53000 | 62 | 70 | 360 |
| Preparation Example 1-7 | 52000 | 61 | 70 | 360 |
| Preparation Example 1-8 | 52000 | 60 | 70 | 360 |
| Preparation Example 1-9 | 53000 | 68 | 350 | 360 |
| Preparation Example 1-10 | 53000 | 68 | 350 | 360 |
| Preparation Example 1-11 | 51500 | 65 | 70 | 360 |
| Comprative Preparation Example 1-1 | — | — | — | 1283 |

<Method of Evaluating the Resin Solution (Radiation-Curable Composition)>

(1) Evaluation of Radiation Curability

The resin solutions obtained in the preparation examples and comparative preparation example were diluted to a solid component concentration of about 20 percent to obtain sample solutions. Each sample solution was coated with a blade (300 μm) on an aramid base and dried for two weeks at room temperature to obtain a coating film 30 to 50 μm in thickness.

Next, an electron beam irradiating apparatus was used to irradiate the coating film three times at an intensity of 10 kG each time, totaling 30 kG.

The film that had been irradiated with the electron beam was then immersed in 100 mL of tetrahydrofuran (THF) and extracted for two hours at 60° C. Following extraction, the film was washed with 100 mL of THF and dried for three hours at 140° C. under a vacuum. Next, the weight of the gel was adopted as the weight of the portion remaining following extraction (and drying) (weight of gel portion/weight of coating film prior to extraction); the value of this portion multiplied by 100 is given as the gelling rate in Table 2. The higher the gelling rate, the stronger the coating, indicating greater progression of radiation curing.

(2) Evaluation of Long-Term Storage Stability

Each of the resin solutions obtained in the preparation examples was stored under sealed conditions at 23° C. and the number of days elapsing until a change in molecular weight as measured by GPC appeared was counted. The results are given in Table 3.

TABLE 2

| | Curability (Gelling rate) |
|---|---|
| Preparation Example 1-1 | 85% |
| Preparation Example 1-2 | 90% |
| Preparation Example 1-3 | 90% |
| Preparation Example 1-4 | 95% |
| Preparation Example 1-5 | 85% |
| Preparation Example 1-6 | 85% |
| Preparation Example 1-7 | 80% |
| Preparation Example 1-8 | 80% |
| Preparation Example 1-9 | 75% |
| Preparation Example 1-10 | 75% |
| Preparation Example 1-11 | 90% |
| Comprative Preparation Example 1-1 | 65% |

TABLE 3

| | Storage stability |
|---|---|
| Preparation Example 1-1 | 250 days or more |
| Preparation Example 1-2 | 250 days or more |
| Preparation Example 1-3 | 250 days or more |
| Preparation Example 1-4 | 250 days or more |
| Preparation Example 1-5 | 250 days or more |
| Preparation Example 1-6 | 250 days or more |
| Preparation Example 1-7 | 250 days or more |
| Preparation Example 1-8 | 250 days or more |
| Preparation Example 1-9 | 250 days or more |
| Preparation Example 1-10 | 250 days or more |
| Preparation Example 1-11 | 14 days |

<Evaluation Results>

As indicated in Table 2, the resin solutions of Preparation Examples 1-1 to 1-11 exhibited greater curability than the resin solutions of Comparative Preparation Example 1-1. Based on these results, it was possible to determine that the radiation-curable vinyl chloride copolymer comprising the structural unit denoted by general formula (1) was highly curable.

Based on the results in Table 3, it was possible to determine that resin solutions (Preparation Examples 1-1 to 1-10) containing both a radiation-curable vinyl chloride copolymer and a benzoquinone compound exhibited good stability over time and had good long-term storage stability. Normally, the addition of a component capable of enhancing long-term storage stability reduces curability, but as shown in Table 2, in Preparation Examples 1-1 to 1-10, the curability of the cured film obtained by irradiation with radiation was good with high gelling rate, indicating that the use of a benzoquinone compound with a radiation-curable vinyl chloride copolymer increased the storage stability without compromising curability.

Preparation Example 2-1

Synthesis of Polyurethane Resin

To a reaction vessel equipped with thermometer, stirrer, Vigrue tube, and Liebig condenser were charged 190 parts of dimethyl terephthalate, 5.9 parts of dimethyl 5-sulfoisophthalate, 152 parts of propylene glycol, and 0.2 part of tetrabutoxytitanium and a transesterification reaction was conducted for 4 hours at 200 to 230° C. The temperature was then raised to 240° C. over 10 minutes while simultaneously gradually reducing the pressure. The mixture was reacted for 30 minutes and polymerization was halted, yielding polyester polyol (a).

One hundred parts of the polyester polyol (a) obtained were dissolved in 37 parts of methyl ethyl ketone (MEK) and 37 parts of toluene. To this were added 12 parts of 4,4'-diphenylmethane diisocyanate (MDI) and 1 part of neopentyl glycol. A 0.05 part quantity of catalyst in the form of dibutyltin dilaurate was added and the mixture was reacted for 5 hours at 80° C. The solution was then diluted with 94 parts of MEK and 94 parts of toluene, yielding a polyurethane resin (Tg=100° C., Mn=25,000, SO$_3$Na group concentration=87 mmol/kg).

Preparation Example 2-2

Synthesis of Radiation-Curable Polyurethane Resin (1) Synthesis of Sulfonate Group-Containing Diol Compound To a flask were charged 100 mL of distilled water, 50 g (0.400 mol) of taurine, and 22.46 g (87 percent purity) of KOH made by Wako Pure Chemical Industries, Ltd. The internal temperature was raised to 50° C. and the contents were thoroughly dissolved.

Next, the internal temperature was cooled to 40° C., 140.4 g (1.080 moles) of butyl glycidyl ether were added dropwise over 30 minutes, the temperature was raised to 50° C., and the mixture was stirred for 2 hours. The solution was cooled to room temperature, 100 mL of toluene was added, the solution was separated, and the toluene layer was discarded. Next, 400 mL of cyclohexanone was added, the temperature was raised to 110° C., and the water was removed with a Dean-Stark apparatus, yielding a 50 percent cyclohexanone solution of sulfonate group-containing diol compound. The $^1$H NMR data of the product are given below. It was determined from the NMR analysis results that the product was a mixture containing other compounds such as Example Compound (S-64) described in Japanese Unexamined Patent Publication (KOKAI) No. 2009-96798 in addition to Example Compound (S-31) described in the same publication.

$^1$H NMR (CDCl3): δ(ppm)=4.5 (br.), 3.95-3.80 (m), 3.50-3.30 (m), 3.25-2.85 (m), 2.65-2.5 (m), 2.45-2.35 (m), 1.6-1.50 (quintuplet), 1.40-1.30 (sextuplet), 1.00-0.90 (triplet).

(2) Preparation of Radiation-Curable Polyurethane Resin

To a flask were charged 57.50 g of the methyl oxirane adduct of 4,4'-(propane-2,2-diyl)diphenol (BPX-1000, weight average molecular weight 1,000, made by Adeka), 6.50 g of glycerol methacrylate (Bremmer GLM made by NOF Corporation), 10.50 g of dimethylol tricyclodecane (TCDM made by Oxea), 3.40 g of the sulfonate group-containing diol compound synthesized in (1) above, 107.66 g of cyclohexanone, and 0.24 g of benzoquinone. Next, a solution comprising 42.21 g of methylenebis(4,1-phenylene)=diisocyanate (MDI) (Millionate MT made by Nippon Polyurethane Industry Co., Ltd.) and 51.47 g of cyclohexanone was added dropwise over 15 minutes. Subsequently, 0.361 g of di-n-butyltin laurate was added, the temperature was raised to 80° C., and the mixture was stirred for 3 hours. When the reaction had ended, 121.28 g of cyclohexanone was added, yielding a polyurethane resin solution. The weight average molecular weight of the radiation-curable functional group-containing polyurethane resin in the resin solution obtained was measured by the same method as in Preparation Example 1 at 36,000. The sulfonate group concentration and radiation-curable functional group (methacryloyloxy group) concentration of the radiation-curable functional group-containing polyurethane resin contained in the resin solution obtained were measured by the same methods as in Preparation Example 1, yielding the following results: sulfonate group concentration=70 mmol/kg, methacryloyloxy group concentration=360 mmol/kg.

3. Examples and Comparative Examples of Magnetic Tape

Example 1

(1) Preparation of Magnetic Layer Coating Liquid

Ferromagnetic metal powder: 100 parts
   Composition: Fe/Co=100/25
   Hc: 195 kA/m (about 2,450 Oe)
   BET specific surface area: 65 m$^2$/g
   Surface treatment agents: Al$_2$O$_3$, SiO$_2$, Y$_2$O$_3$
   Particle size (major axis diameter): 38 nm
   Acicular ratio: 5
   σs: 110 A·m$^2$/kg (about 110 emu/g)
trans-Cinnamic acid: 5 parts
Vinyl chloride copolymer MR104 (made by Zeon Corporation): 10 parts
Polyurethane resin prepared in Preparation Example 2-1: 10 parts
Methyl ethyl ketone: 150 parts
Cyclohexanone: 150 parts
α-Al$_2$O$_3$ (Mohs' hardness 9, average particle diameter 0.1 μm): 15 parts
Carbon black (average particle diameter 0.08 μm): 0.5 part The various components of the above coating material were kneaded in an open kneader and dispersed using a sand mill. To the dispersion obtained were added:

Butyl stearate: 1.5 parts;
Stearic acid: 0.5 part;
Methyl ethyl ketone: 50 parts;
Cyclohexanone: 50 parts;
Toluene: 3 parts; and
Polyisocyanate compound (Coronate 3041 made by Nippon Polyurethane Industry Co., Ltd.): 5 parts.

The mixture was stirred for another 20 minutes, processed with ultrasound, and passed through a filter with an average pore diameter of 1 μm to prepare a magnetic layer coating liquid.

(2) Preparation of Nonmagnetic Layer Coating Liquid

Nonmagnetic powder ($\alpha Fe_2O_3$ hematite): 75 parts
    Major axis length: 0.15 μm
    BET specific surface area: 52 m²/g
    pH: 9
    Tap density: 0.8
    Surface treatment agents: $Al_2O_3$, $SiO_2$
Carbon black: 25 parts
    Average primary particle diameter: 0.020 μm
    DBP absorption capacity: 80 mL/100 g
    pH: 8.0
    BET specific surface are: 250 m²/g
    Volatile content: 1.5 percent
Binder c (vinyl chloride copolymer (MR104 made by Zeon Corporation)): 12 parts
Binder a (electron beam-curable polyurethane resin prepared in Preparation Example 2-1): 7.5 parts (based on solid)
Methyl ethyl ketone: 150 parts
Cyclohexanone: 150 parts The various components of the above coating material were kneaded in an open kneader and dispersed using a sand mill. To the dispersion obtained were added:
Butyl stearate: 1.5 parts;
Stearic acid: 1 part;
Methyl ethyl ketone: 50 parts; and
Cyclohexanone: 50 parts.
The mixture was stirred and passed through a filter with an average pore diameter of 1 μm to prepare a coating liquid for the lower coating layer (nonmagnetic layer).

(3) Preparation of Backcoat Layer Coating Liquid

Carbon black (average particle diameter 40 nm): 85 parts;
Carbon black (average particle diameter 100 nm): 3 parts;
Nitrocellulose: 28 parts;
Polyurethane resin: 58 parts;
Copper phthalocyanine dispersing agent: 2.5 parts;
Polyurethane resin (Nipporan 2301 made by Nippon Polyurethane Industry Co., Ltd.): 0.5 part;
Methyl isobutyl ketone: 0.3 part;
Methyl ethyl ketone: 860 parts; and
Toluene: 240 parts
were prekneaded in a roll mill and then dispersed in a sand mill.
Polyester resin (Vylon 500 made by Toyobo Co., Ltd.): 4 parts;
Polyisocyanate compound (Coronate 3041 made by Nippon Polyurethane Industry Co., Ltd.): 14 parts; and
$\alpha$-$Al_2O_3$ (Sumitomo Chemicals): 5 parts
were added and the mixture was stirred and filtered to obtain a backcoat layer coating liquid.

(4) Preparation of Magnetic Recording Medium

An adhesive in the form of a sulfonic acid-containing polyester resin was applied with a coil bar to a polyethylene naphthalate resin support 5 μm in thickness in such a manner as to yield a thickness upon drying of 0.05 μm. A model HD-2000 optical interferotype surface roughness meter made by WYKO was employed to measure a 240 μm×180 μm surface area on the side of the support on which the adhesive layer had been applied. Following gradient correction and cylindrical correction, the center line average roughness was 0.002 μm. Spatial frequency analysis revealed the PSD of the 5 μm wavelength to be 3,000 nm³ and the PSD of the 20 μm wavelength to be 15,000 nm³. This was employed as the support.

Next, the above-described nonmagnetic layer coating liquid was applied in such a manner as to yield a thickness upon drying of 1.0 μm, and the coating layer of nonmagnetic layer coating liquid was irradiated with a 40 kGy electron beam to form a nonmagnetic layer (radiation-cured layer).

Immediately thereafter, the magnetic layer coating liquid was multilayer coated in such a manner as to yield a magnetic layer thickness upon drying of 0.06 μm, oriented with a solenoid having a magnetic force of 0.4 T (4,000 G), and dried. The backcoat layer coating liquid was applied in such a manner as to yield a thickness upon drying of 0.5 μm on the reverse surface of the nonmagnetic support. Next, processing was conducted with a seven-stage calender comprised of metal rolls at 100° C. at a speed of 80 m/minute (calender pressure 300 kg/cm), and the product was slit to a ½ inch width to prepare a magnetic tape.

Example 2

With the exception that the vinyl chloride copolymer employed in the nonmagnetic lower layer was replaced with 12 parts (based on solid) of binder b (the electron beam-curable vinyl chloride copolymer prepared in Preparation Example 1-1), a magnetic tape was prepared by the same method as in Example 1.

Examples 3 to 9

With the exceptions that the type and/or quantity of nonmagnetic powder ($\alpha Fe_2O_3$ hematite) and carbon black added to the nonmagnetic lower layer, the quantity of binder added, and the thickness of the nonmagnetic lower layer were changed as indicated in Table 4, magnetic tapes were prepared by the same method as in Example 2. The nonmagnetic powder ($\alpha Fe_2O_3$ hematite) employed in Examples 4 and 5 had a major axis length of 0.070 μm, a BET specific surface area of 75 m²/g, a pH of 9, and a tap density of 0.8, and was surface treated with $Al_2O_3$ and $SiO_2$. In Examples 6 and 7, carbon blacks having the BET specific surface areas indicated in Table 4 were employed.

Example 10

With the exception that the magnetic powder in the magnetic layer was changed as indicated below, a magnetic tape was prepared by the same method as in Example 1. Ferromagnetic plate-shaped hexagonal ferrite powder: 100 parts
Composition excluding oxygen (mole ratio): Ba/Fe/Co/Zn=1/9/0.2/1
Hc: 176 kA/m (2,200 Oe)
Average plate diameter: 20 nm
Average plate ratio: 3
BET specific surface area: 65 m²/g
σs: 49 A·m²/kg (49 emu/g)

Example 11

With the exception that the vinyl chloride copolymer employed in the nonmagnetic lower layer was changed to 12 parts (based on solid) of the electron beam-curable vinyl chloride copolymer prepared in Preparation Example 1-1, a magnetic tape was prepared by the same method as in Example 10.

Comparative Examples 1 to 10

With the exceptions that the type and/or quantity of nonmagnetic powder ($\alpha Fe_2O_3$ hematite) and carbon black added to the nonmagnetic lower layer, the type and/or quantity of binder added, and the thickness of the nonmagnetic lower layer were changed as indicated in Table 4, magnetic tapes were prepared by the same method as in Example 1. Binders d and e employed in Comparative Examples were as follows.
Binder d: Electron Beam-Curable Vinyl Chloride Copolymer Obtained by acrylating (acrylic content: 6 mol/mol) MR110, a vinyl chloride epoxy-containing monomer copolymer made by Zeon Corporation (average degree of polymerization: 310; epoxy content: 3 weight percent), with 2-isocyanate ethyl methacrylate.
Binder e: Electron Beam-Curable Polyurethane Resin Hydroxy-containing acryl compound-phosphonic acid group-containing phosphorus compound-hydroxy-containing polyester polyol.
Weight average molecular weight: 23,000
P content: 0.2 weight percent
Acrylic content: 8 mols/mol Comparative Example 11

With the exceptions that no carbon black was added, the type and quantity of nonmagnetic powder ($\alpha Fe_2O_3$ hematite) of nonmagnetic powder added to the nonmagnetic lower layer, and the type and quantity of binder added were changed, a magnetic tape was prepared in the same manner as in Example 10.
Evaluation Methods
(1) Void Ratio of Nonmagnetic Layer The backcoat layers of the magnetic tapes of Examples and Comparative Examples were stripped away with solvent and the void ratios of the nonmagnetic layers were measured. The void ratio was calculated by measuring the total fine pore volume by $N_2$ gas adsorption at the temperature of liquid nitrogen using an autosorb. That is, the void ratio was calculated from the nitrogen saturation adsorption curve and the separation curve when the nitrogen partial pressure was gradually lowered from a state of saturation adsorption. Specifically, the surface void ratio was obtained with a model AS-1 Autosorb-1 Sorption System made by Quantachrome.

(2) Coefficient of Friction

A round cylindrical rod of AlTiC was brought into contact with the magnetic layer surface in an environment of 23° C. and 50 percent humidity. A load of 100 g (T1) was applied, and the tensile force (T2) required to slide at a sliding rate of 14 mm/s at a winding angle of 180° was measured. The coefficient of friction was calculated from the following equation based on the measurement value when ten passes of repeated sliding were conducted. Tapes that stuck to the round cylindrical rod of AlTiC during measurement have been denoted as "Stuck" in Table 4.
Coefficient of friction: $\mu = \pi \cdot \ln(T2/T1)$
(3) Abrasion The surface of the magnetic layer of the magnetic tape was brought into contact with one edge of an AlFeSil square rod at a lapping angle of 12° in a manner perpendicular to the longitudinal direction of the AlFeSil square rod (square rod specified by ECMA-288/Annex H/H2) in an environment of 23° C. and 50 percent humidity. In that state, a 580 m length of the magnetic tape was passed back and forth 50 times at a rate of 3 m/s with the application of a tensile force of 1.0 N. The width of abrasion of the AlFeSil square rod was then evaluated as the abrasion.
(4) Magnetic Layer Surface Roughness Before and after Calendering The center plane average surface roughness Ra of the magnetic layer surface was measured by an atomic force microscope under the above measurement conditions before and after calendering. The surface roughness Ra following calendering and the change in the surface roughness, calculated as $\Delta Ra = (Ra\ before\ calendering) - (Ra\ after\ calendering)$, are given in Table 4.
(5) Electromagnetic Characteristics (BB-SNR)

The S/N ratio (BB-SNR) of each magnetic tape was measured in a ½ inch linear system with a secured head. The relative speed between the head and the tape was set to 2 m/sec. The optimal recording current of each tape was set. A signal was recorded at a recording wavelength of 0.2 µm, and the reproduced signal was frequency analyzed with a spectral analyzer made by Shibasoku. The ratio of the carrier signal (wavelength 0.2 µm) output to the integral noise of the entire spectral range was adopted as the S/N ratio. Table 4 shows the relative values of magnetic tapes of ferromagnetic metal powders (recorded as "MP" in Table 4) adopting Comparative Example 1 as 0 dB, and the relative values of hexagonal ferrite powders (recorded as "BaFe" in Table 4) adopting Comparative Example 11 as 0 dB.

The above results are given in Table 4.

TABLE 4

| | Nonmagnetic lower layer | | | | | | | | | | | | Surface roughness Ra of magnetic layer | | | | | Electromagnetic characteristics BB-SNR | |
|---|---|---|---|---|---|---|---|---|---|---|---|---|---|---|---|---|---|---|---|
| | Type of ferromagnetic powder | αFe₂O₃ | | Carbon black | | Vinyl chloride copolymer | | Polyurethane | | Total weight of binder (Parts) | Value of eq. (I) | Thickness of lower layer (μm) | Void ratio % | Before calendering Rax (nm) | After calendering Ray (nm) | Change in Ra ΔRa Rax-Ray (nm) | Coefficient of friction | Abrasion (μm) | MP (db) | BaFe (db) |
| | | BET (m²/g) | Weight (Parts) | BET (m²/g) | Weight (Parts) | Type | Weight (Parts) | Type | Weight (Parts) | | | | | | | | | | | |
| Ex. 1 | MP | 52 | 75 | 250 | 25 | c | 12 | a | 7.5 | 19.5 | 521 | 1.0 | 29.2 | 9.76 | 3.07 | 6.69 | 0.34 | 35 | 1.6 | |
| Ex. 2 | MP | 52 | 75 | 250 | 25 | b | 12 | a | 7.5 | 19.5 | 521 | 1.0 | 30.3 | 8.79 | 2.18 | 6.61 | 0.33 | 27 | 3.6 | |
| Ex. 3 | MP | 52 | 78 | 250 | 22 | b | 12 | a | 7.5 | 19.5 | 490 | 1.0 | 26.5 | 8.87 | 2.59 | 6.28 | 0.32 | 33 | 2.5 | |
| Ex. 4 | MP | 75 | 75 | 250 | 25 | b | 13 | a | 8.0 | 21.0 | 565 | 1.0 | 32.2 | 8.94 | 2.21 | 6.73 | 0.33 | 28 | 3.5 | |
| Ex. 5 | MP | 75 | 72 | 250 | 28 | b | 12 | a | 7.5 | 19.5 | 636 | 1.0 | 35.5 | 10.41 | 2.92 | 7.49 | 0.30 | 30 | 2.1 | |
| Ex. 6 | MP | 52 | 35 | 125 | 65 | b | 12 | a | 7.5 | 19.5 | 510 | 1.0 | 27.9 | 9.13 | 2.79 | 6.34 | 0.32 | 31 | 2.3 | |
| Ex. 7 | MP | 52 | 35 | 75 | 85 | b | 12 | a | 6.0 | 16.0 | 512 | 1.0 | 27.7 | 9.22 | 2.81 | 6.41 | 0.32 | 32 | 2.1 | |
| Ex. 8 | MP | 52 | 75 | 250 | 25 | b | 12 | a | 7.5 | 19.5 | 521 | 0.6 | 30.0 | 9.00 | 2.61 | 6.39 | 0.30 | 33 | 2.4 | |
| Ex. 9 | MP | 52 | 75 | 250 | 25 | b | 12 | a | 7.5 | 19.5 | 521 | 1.3 | 30.1 | 9.22 | 2.44 | 6.78 | 0.35 | 29 | 2.8 | |
| Ex. 10 | BaFe | 52 | 75 | 250 | 25 | c | 12 | a | 7.5 | 19.5 | 521 | 1.0 | 29.9 | 8.83 | 2.33 | 6.50 | 0.34 | 35 | | 1.8 |
| Ex. 11 | BaFe | 52 | 75 | 250 | 25 | b | 12 | a | 7.5 | 19.5 | 521 | 1.0 | 30.2 | 8.19 | 1.89 | 6.30 | 0.33 | 28 | | 3.5 |
| Comp. Ex. 1 | MP | 49 | 100 | 0 | 0 | d | 10 | e | 10.0 | 20.0 | 245 | 1.0 | 4.7 | 8.68 | 4.01 | 4.67 | 0.35 | 54 | 0.0 | |
| Comp. Ex. 2 | MP | 53 | 80 | 70 | 20 | d | 10 | e | 10.0 | 20.0 | 282 | 1.0 | 5.5 | 9.36 | 4.20 | 5.16 | 0.36 | 49 | -0.1 | |
| Comp. Ex. 3 | MP | 52 | 75 | 250 | 25 | d | 12 | e | 7.5 | 19.5 | 521 | 1.0 | 28.9 | 11.01 | 3.89 | 7.12 | 0.37 | 42 | 0.1 | |
| Comp. Ex. 4 | MP | 52 | 78 | 250 | 25 | b | 18 | a | 10.0 | 28.0 | 363 | 1.0 | 10.1 | 8.39 | 3.70 | 4.69 | 0.37 | 46 | 0.5 | |
| Comp. Ex. 5 | MP | 52 | 60 | 250 | 22 | b | 13 | a | 8.0 | 21.0 | 455 | 1.0 | 16.1 | 8.66 | 3.66 | 5.00 | 0.34 | 40 | 0.6 | |
| Comp. Ex. 6 | MP | 52 | 55 | 250 | 40 | b | 12 | a | 7.5 | 19.5 | 673 | 1.0 | 35.5 | 11.21 | 3.88 | 7.33 | 0.38 | 40 | 0.2 | |
| Comp. Ex. 7 | MP | 52 | 75 | 250 | 45 | b | 12 | a | 7.5 | 19.5 | 724 | 1.0 | 37.3 | 11.32 | 3.69 | 7.63 | 0.40 | 42 | 0.5 | |
| Comp. Ex. 8 | MP | 52 | 75 | 250 | 25 | b | 12 | a | 7.5 | 19.5 | 521 | 0.4 | 29.8 | 9.10 | 3.67 | 5.43 | 0.30 | 45 | 0.7 | |
| Comp. Ex. 9 | MP | 52 | 75 | 250 | 25 | b | 12 | a | 7.5 | 19.5 | 521 | 1.5 | 30.1 | 9.21 | 2.51 | 6.70 | Stuck | Measurement was impossible. | 2.6 | |
| Comp. Ex. 10 | MP | 52 | 75 | 250 | 25 | b | 12 | a | 7.5 | 19.5 | 521 | 1.9 | 30.0 | 9.30 | 2.59 | 6.71 | Stuck | Measurement was impossible. | 2.5 | |
| Comp. Ex. 11 | BaFe | 49 | 100 | 0 | 0 | d | 10 | e | 10.0 | 20.0 | 245 | 1.0 | 4.5 | 8.48 | 3.59 | 4.89 | | Measurement was impossible. 58 | | 0.0 |

Evaluation Results

As shown in Table 4, the magnetic tapes of Examples 1 to 11 all exhibited good electromagnetic characteristics relative to Comparative Examples. This was attributed to the fact that improved surface smoothness of the magnetic layer was possible due to good calendering processability (a large ΔRa) despite thinning of the nonmagnetic layer. This calendering processability was presumed to be the result of having imparted suitable voids to the nonmagnetic layer by satisfying equation (I).

Since cushioning was good in such magnetic tapes having a nonmagnetic layer in which suitable voids were formed, the level of abrasion of members during running was low and good running durability was exhibited. When voids were formed in this manner in conventional magnetic tapes having relatively thick nonmagnetic layers, the coefficient of friction tended to rise and the running property tended to deteriorate. This point was confirmed by the fact that the coefficient of friction rose excessively and sticking precluded evaluation of the coefficient of friction and abrasion in Comparative Examples 9 and 10. By contrast, the coefficient of friction did not increase and stable running was possible in the magnetic tapes of Examples.

The reason even better electromagnetic characteristics were achieved in Examples 2 to 9 and 11, in which Copolymer B was employed as an additional binder component, was presumed to be as follows. First, this copolymer cured well when irradiated with radiation, effectively preventing roughening due to dissolution of the nonmagnetic layer surface by the coating liquid during application of the magnetic layer coating liquid. Further, since the urethane bonds in the structural unit denoted by general formula (1) that were contained in the copolymer had good affinity for the polyurethane resin employed in combination and good affinity for the solvent in the nonmagnetic layer coating liquid, it was thought that the stability of the coating liquid and dispersion of the nonmagnetic powder increased and a role was played in further enhancing the electromagnetic characteristics.

By contrast, the magnetic tapes of Comparative Examples 1, 2, 4, 5 and 11 exhibited a drop in electromagnetic characteristics. The reason for this was thought to be poor calendering processability due to a value in equation (I) of less than 480.

Comparative Example 3 satisfied equation (I) but exhibited a poor polyurethane resin dispersion-enhancing effect, so the Ra prior to calendering was high, resulting in a drop in electromagnetic characteristics.

Comparative Examples 6 and 7 exhibited values exceeding 650 in equation (1), and so had excessively low quantities of binder and were unable to ensure dispersion. This was thought to result in a drop in electromagnetic characteristics.

Comparative Example 8 had an excessively thin nonmagnetic layer, making it impossible to ensure electromagnetic characteristics.

Comparative Examples 9 and 10 exhibited good electromagnetic characteristics, but had poor running properties. This was presumed to be the result of numerous voids despite a thick nonmagnetic layer, resulting in an excessive supply of lubricant to the surface of the magnetic layer and an excessively high coefficient of friction.

Based on these results, the present invention was confirmed to simultaneously achieve good electromagnetic characteristics, running properties, and running durability in a high recording capacity magnetic tape with a thin nonmagnetic layer. Further, the magnetic tape with these good characteristics can be obtained without multiple calendering processes, thereby enhancing productivity.

The magnetic tape of the present invention is suitable as a high recording capacity data backup tape.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior

What is claimed is:

1. A magnetic tape comprising a nonmagnetic radiation-cured layer containing a nonmagnetic powder and a binder component and a magnetic layer containing a ferromagnetic powder and a binder in this order on a nonmagnetic support, wherein the binder component comprises a radiation-curable polyurethane resin that has been radiation-cured and obtained from starting materials containing a sulfonic acid group containing- or sulfonate group-containing polyol compound denoted by formula (2a):

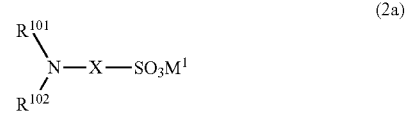

wherein, in formula (2a), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation;

the nonmagnetic radiation-cured layer has a thickness ranging from 0.5 to 1.3 μm, a relation between the nonmagnetic powder and the binder component contained in the radiation-curable composition satisfies equation (I) below:

480≤(BET specific surface area of the nonmagnetic powder (m²/g)×weight of the nonmagnetic powder (g))/weight of the binder component (g)≤650    (I);

and the binder component further comprises a radiation-curable vinyl chloride copolymer containing a structural unit denoted by formula (1):

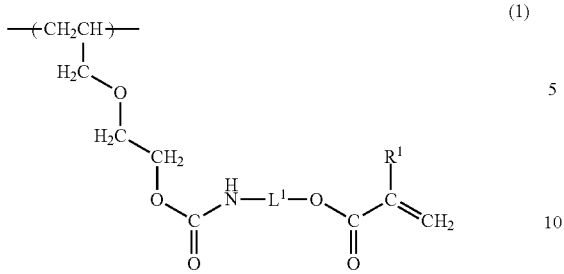

wherein, in formula (1), $R^1$ denotes a hydrogen atom or a methyl group, and $L^1$ denotes a divalent linking group denoted by formula (2), formula (3), or formula (4);

$$—CH_2CH_2—, \qquad (2)$$

$$—CH_2CH_2OCH_2CH_2—, \qquad (3)$$

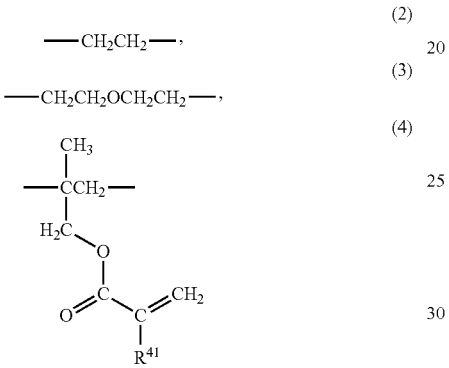

wherein, in formula (4), $R^{41}$ denotes a hydrogen atom or a methyl group.

2. The magnetic tape according to claim 1, wherein the radiation-curable vinyl chloride copolymer further comprises a structural unit denoted by formula (5):

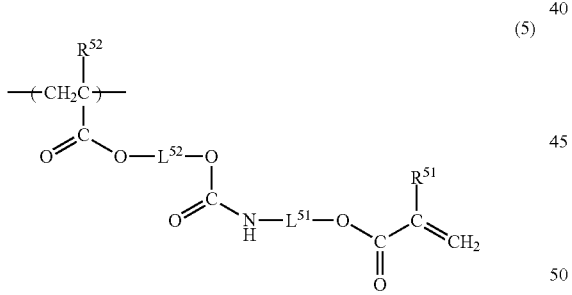

wherein, in formula (5), each of $R^{51}$ and $R^{52}$ independently denotes a hydrogen atom or a methyl group, $L^{51}$ denotes the divalent linking group denoted by the above formula (2), formula (3), or formula (4), and $L^{52}$ denotes a divalent linking group.

3. The magnetic tape according to claim 1, wherein the radiation-curable vinyl chloride copolymer further comprises a cyclic ether structure.

4. The magnetic tape according to claim 1, wherein the radiation-curable vinyl chloride copolymer further comprises a polar group selected from the group consisting of a sulfonic acid group, a sulfonate group, a sulfuric acid group, and a sulfate group.

5. The magnetic tape according to claim 1, wherein the nonmagnetic radiation-cured layer has a void ratio ranging from 25 to 38 volume percent.

6. The magnetic tape according to claim 1, wherein the magnetic layer has a thickness ranging from 0.01 to 0.10 μm.

7. The magnetic tape according to claim 1, wherein the magnetic layer has a center plane average surface roughness, Ra, measured by an atomic force microscope ranging from 1.00 to 3.30 nm.

8. A method of manufacturing a magnetic tape, wherein the magnetic tape is the magnetic tape according to claim 1, and the method comprises:

coating and curing with radiation a radiation-curable composition to form a nonmagnetic layer in the form of a radiation-cured layer, wherein the radiation-curable composition comprises a nonmagnetic powder and a binder component with a relation between the nonmagnetic powder and the binder component satisfying equation (I) below:

480≤(BET specific surface area of the nonmagnetic powder ($m^2$/g)×weight of the nonmagnetic powder (g))(weight of the binder component (g))≤650 (I), the binder component comprising a radiation-curable polyurethane resin obtained from starting materials containing a sulfonic acid group containing- or sulfonate group-containing polyol compound denoted icy formula (2a):

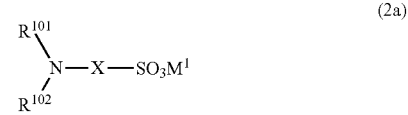

wherein, in formula (2a), X denotes a divalent linking group, each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation, and the binder component further comprising a radiation-curable vinyl chloride copolymer containing a structural unit denoted by formula (1):

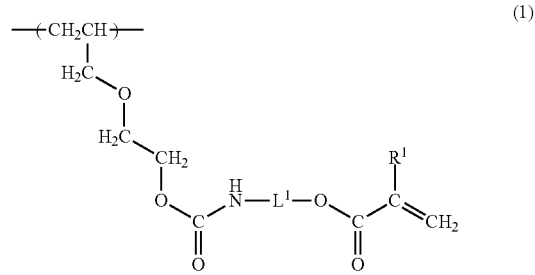

wherein, in formula (1), $R^1$ denotes a hydrogen atom or a methyl group, and $L^1$ denotes a divalent linking group denoted by formula (2), formula (3), or formula (4):

$$—CH_2CH_2—, \qquad (2)$$

-continued

—CH₂CH₂OCH₂CH₂— , (3)

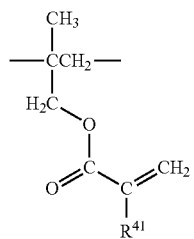
(4)

wherein, in formula (4), $R^{41}$ denotes a hydrogen atom or a methyl group, forming a magnetic layer on the radiation-cured layer that has been formed, and then conducting calendaring, wherein no calendaring is conducted on the nonmagnetic prior to forming the magnetic layer.

9. The method of manufacturing a magnetic tape according to claim 8, wherein the calendaring is conducted to achieve a change ΔRa in a center plane average surface roughness Ra ranging from 6.00 to 7.50 nm on the magnetic layer as measured by an atomic force microscope.

* * * * *